US012579457B2

(12) United States Patent
Mitsuyoshi

(10) Patent No.: US 12,579,457 B2
(45) Date of Patent: Mar. 17, 2026

(54) QUANTUM GATE AND QUANTUM COMPUTER

(71) Applicant: The University of Tokyo, Tokyo (JP)

(72) Inventor: Shunji Mitsuyoshi, Tokyo (JP)

(73) Assignee: The University of Tokyo, Tokyo (JP)

( * ) Notice: Subject to any disclaimer, the term of this patent is extended or adjusted under 35 U.S.C. 154(b) by 684 days.

(21) Appl. No.: 17/769,715

(22) PCT Filed: Oct. 16, 2020

(86) PCT No.: PCT/JP2020/039159
§ 371 (c)(1),
(2) Date: Apr. 15, 2022

(87) PCT Pub. No.: WO2021/075566
PCT Pub. Date: Apr. 22, 2021

(65) Prior Publication Data
US 2022/0374753 A1 Nov. 24, 2022

(30) Foreign Application Priority Data

Oct. 17, 2019 (JP) ................................. 2019-190300

(51) Int. Cl.
*G06N 10/20* (2022.01)
*G06N 10/40* (2022.01)

(52) U.S. Cl.
CPC ............. *G06N 10/20* (2022.01); *G06N 10/40* (2022.01)

(58) Field of Classification Search
CPC ...................................................... G06N 10/20
USPC ........................................................ 716/104
See application file for complete search history.

(56) References Cited

U.S. PATENT DOCUMENTS

2004/0078421 A1* 4/2004 Routt ..................... G06N 10/20
709/201
2017/0220924 A1 8/2017 Danjo et al.

FOREIGN PATENT DOCUMENTS

JP 2006-331249 A 12/2006
JP 2017-138760 A 8/2017

* cited by examiner

*Primary Examiner* — Eric D Lee
(74) *Attorney, Agent, or Firm* — PROCOPIO, CORY, HARGREAVES & SAVITCH LLP

(57) ABSTRACT

The present invention provides a novel quantum gate as an oracle that exists with a quantum idea based on the concept of an N-dimensional unitary space including a complex space, by introducing Riemannian geometry being non-Euclidean geometry in an N-dimensional Euclidean space, and simultaneously expanding the frame of the space. The quantum gate according to the present invention is used for a quantum computer operation using an operator that has a simultaneous calculation characteristic of simultaneously performing a plurality of calculations, and includes PPT indicating a proposition, CON indicating converse, INV indicating inverse, ANT indicating anti, MU indicating nothing, MGN$_+$ or MGN$_-$ indicating infinity, and KU indicating fluctuation.

4 Claims, 25 Drawing Sheets

Fig. 1
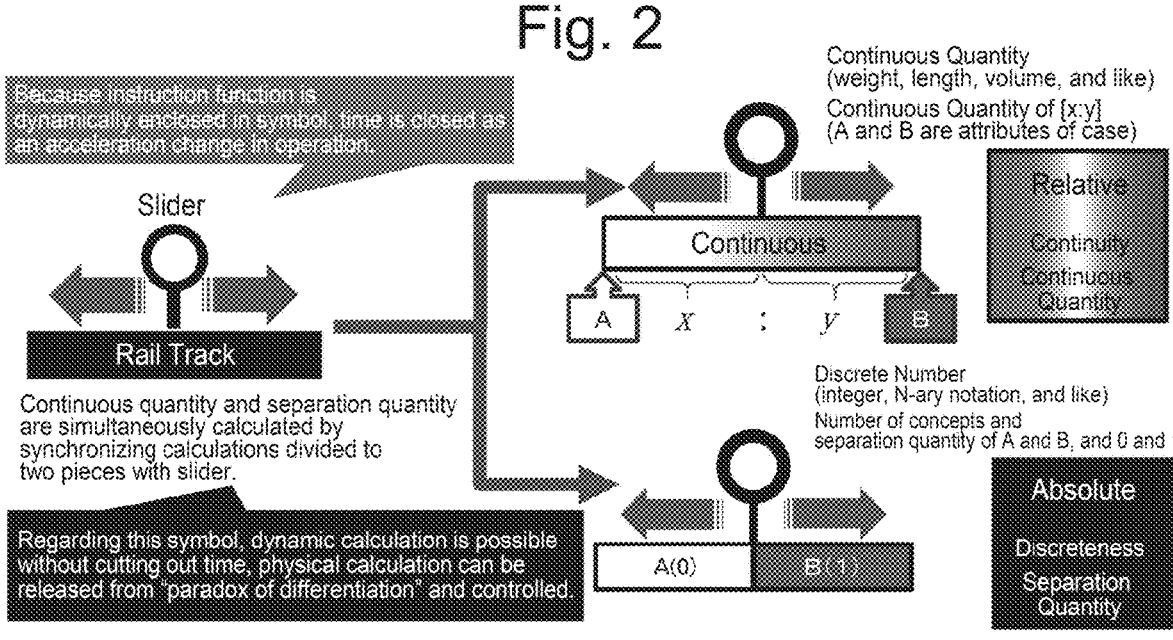
Fig. 2
Fig. 3
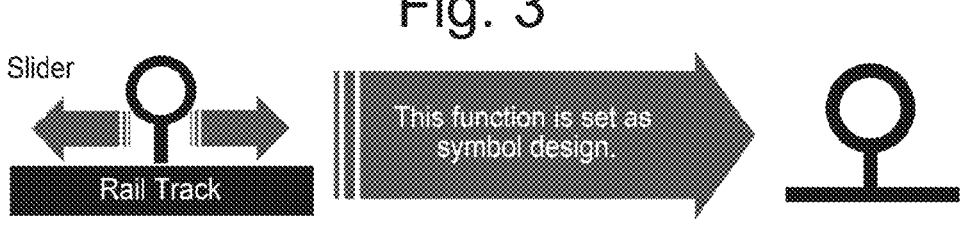

Fig. 4

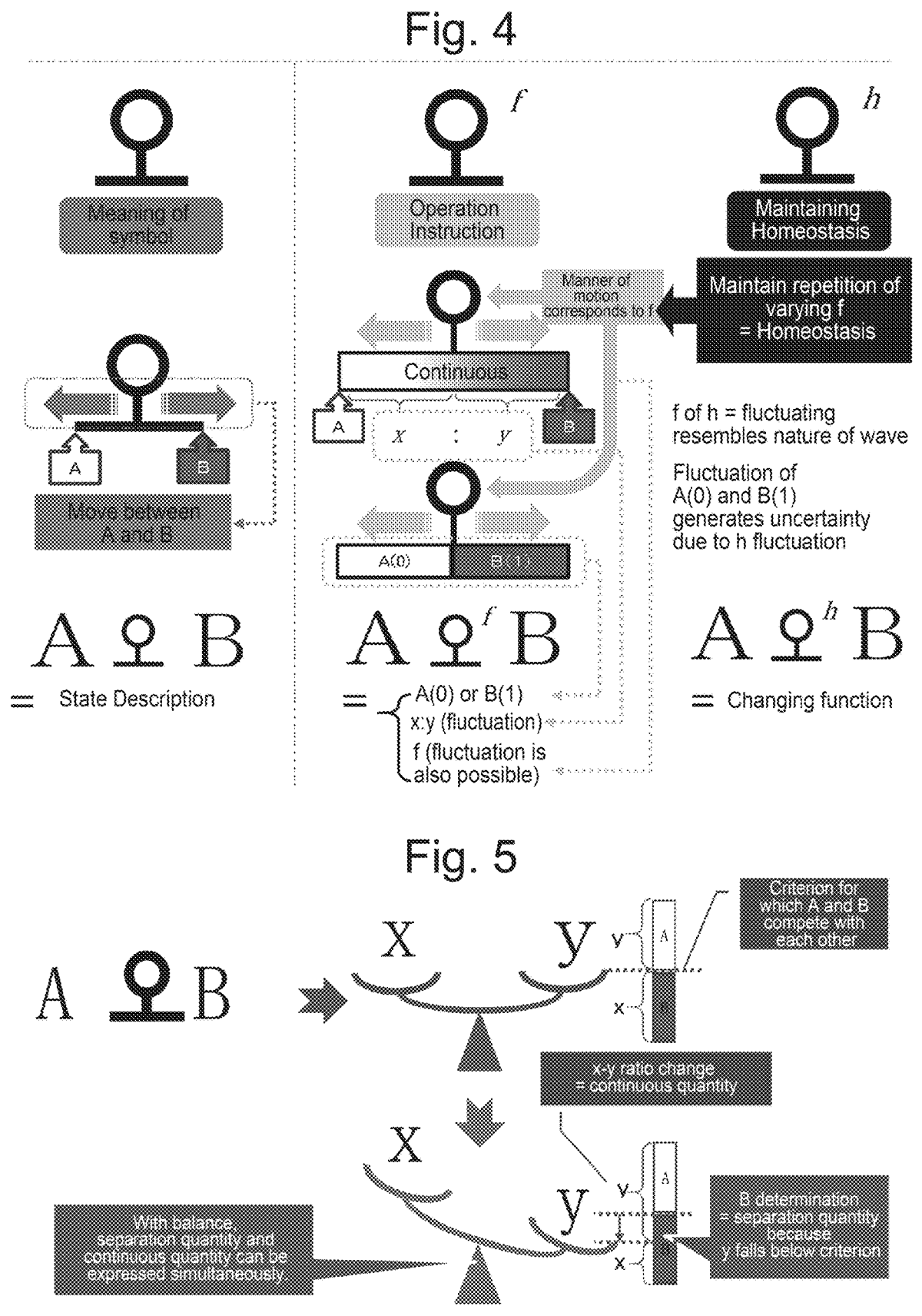

Meaning of symbol

Move between A and B $$A \underset{\text{(symbol)}}{\Omega} B$$

= State Description

Operation Instruction

Manner of motion corresponds to f

Continuous

A    $x$ : $y$    B

A(0)    B(1)

$$A \overset{f}{\Omega} B$$

= { A(0) or B(1)
x:y (fluctuation)
f (fluctuation is also possible) }

Maintaining Homeostasis

Maintain repetition of varying f = Homeostasis f of h = fluctuating resembles nature of wave Fluctuation of A(0) and B(1) generates uncertainty due to h fluctuation $$A \overset{h}{\Omega} B$$

= Changing function

Fig. 5

Criterion for which A and B compete with each other x-y ratio change = continuous quantity B determination = separation quantity because y falls below criterion With balance separation quantity and continuous quantity can be expressed simultaneously

Fig. 13
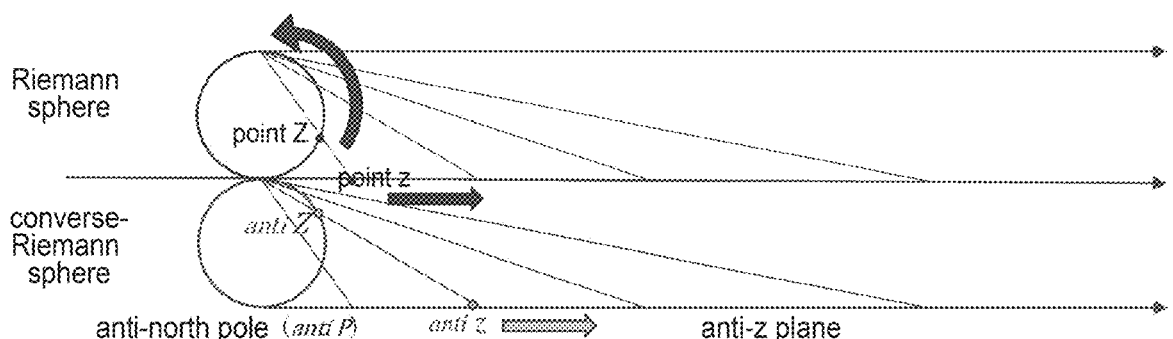
Fig. 14
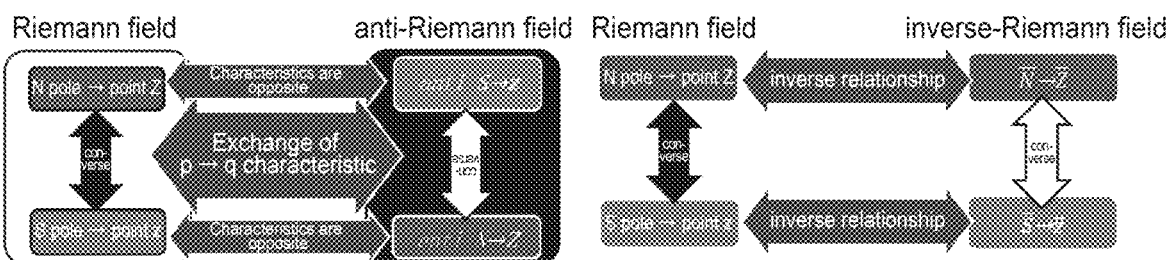
Fig. 15
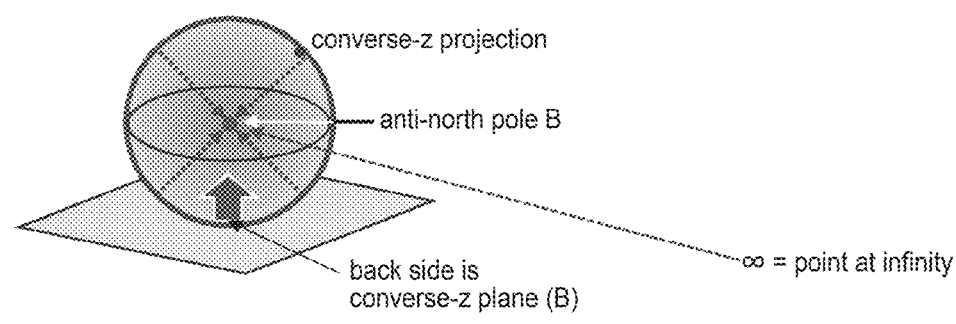
Fig. 16

When anti-∞ {0 ≡ ∞ } is introduced to
anti-0/1 and anti-0/0 as
opposed to anti-0, anti-0/1 = 1,
and anti-0/0 = ∞

Assuming that state after anti-0 is anti-Einstein (anti-Riemann field), 1/0 = ∞ and 0/1 = 0 in
Einstein (Riemann field), and thus conditions of securing Energy for
simultaneously establishing anti-Riemann field and 0 ≡ ∞ are to be provided in
anti-0 = {0 ⇒ 1} as rows. This is set to {0 ≡ ∞} as anti-∞

In Mitsuyoshi operator having function of moving, there is no need to consider differentiation and time, so both $\lim_{n \to 0} \square$ and $\lim_{n \to \infty} \square$ are provided in same figure.

$$0 \equiv \infty$$

continuous matter quantity number of discrete concepts

When all vectors are directed toward zero, it becomes like "sea urchin",
and all vectors are orthogonal at limiting state zero.

Here, separation points for Einstein field and anti-Einstein field become perfect vacuum zero.

Fig. 39
(a)
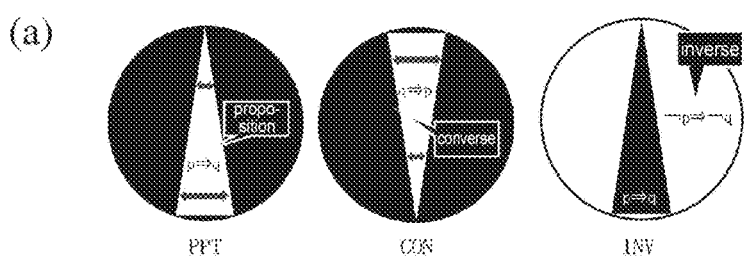
(b)
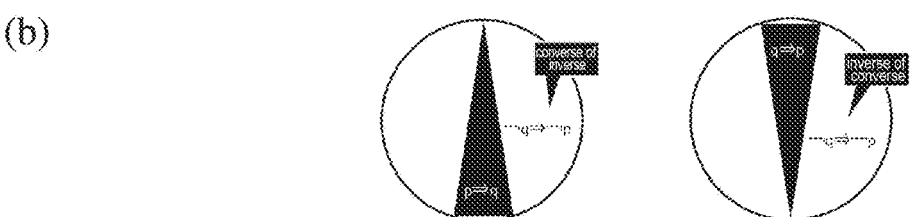
(c)
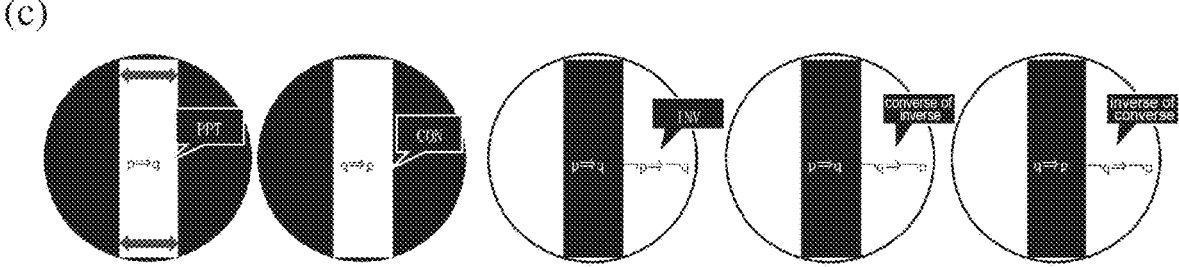
(d)
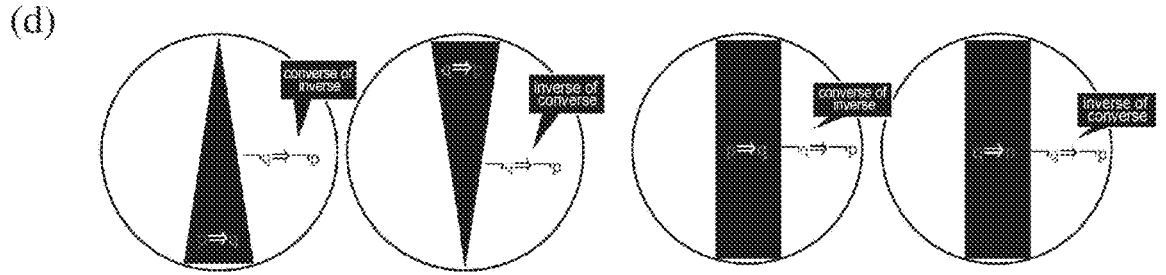

Fig. 41
(a)
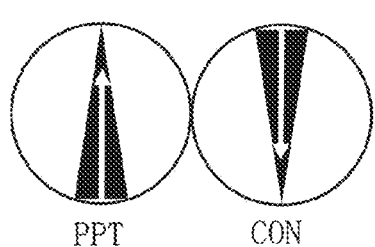
(b)
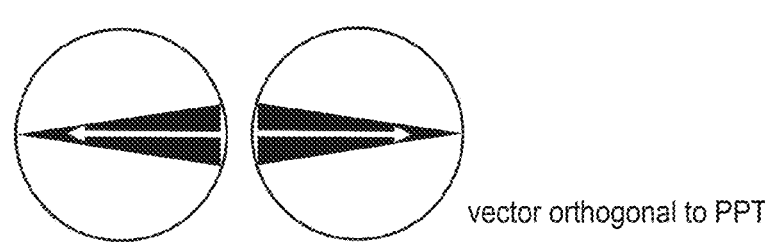
vector orthogonal to PPT
(c)
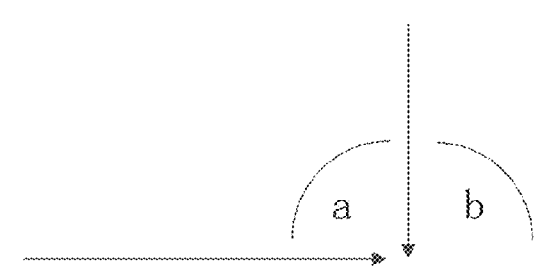

Fig. 52

| positive | negative | anti | converse | inverse |
|---|---|---|---|---|
| +A | −A | A： anti～A | A： converse～A | A： inverse～A |

Fig. 53

| Proposition | Converse | Inverse | Anti | Contraposition | Mu | Mugen | Ku |
|---|---|---|---|---|---|---|---|
| $p_+ \Rightarrow q_-$ | $q_- \Rightarrow p_+$ | $\neg p_+ \Rightarrow \neg q_-$ | $p_- \Rightarrow q_+$ $(p_- \neq \neg p_+)\&(q_+ \neq \neg q_-)$ $(p \Rightarrow q_+)$ $\neg(p_+ \Rightarrow q_-)\& \neg p_+ \Rightarrow q_- \neq p_+$ | $\neg q_- \Rightarrow \neg p_+$ | $(p_+ \Rightarrow q_-)=0$ | $(p_+ \Rightarrow q_-)=\infty$ $=MGN_+$ $CON\infty = MGN(0\equiv\infty)$ | $MGN_+ \supseteq MGN_-$ $(\infty \equiv 0)=1$ |
| PPT | CON | INV | ANT | CTP | MU | MGN$_+$ MGN$_-$ | KU |

QUANTUM GATE AND QUANTUM COMPUTER

This application is US National Stage of International Patent Application PCT/JP2020/039159, filed Oct. 16, 2020, which claims benefit of priority from Japanese Patent Application JP2019-190300, filed Oct. 17, 2019, the contents of both of which are incorporated herein by reference.

TECHNICAL FIELD

The present invention relates to a quantum gate used for a quantum computer operation and a quantum computer.

BACKGROUND ART

In recent years, a computer (quantum computer below) that realizes parallelism by using a quantum superposition state (quantum superposition state below) in comparison to a computer (classical computer below) that holds a number in binary and performs an operation by setting the basic unit of calculation as Bit (binary unit) and taking a state of either 0 or 1 for each bit is attracting attention.

As a calculation technique used in the quantum computer, for example, a calculation technique called a quantum annealing method, a calculation technique of a quantum gate method, and the like are exemplified (see Patent Documents 1 and 2). In the calculation technique called the quantum annealing method, a unit called a quantum bit (or qubit) capable of simultaneously indicating 1 and 0 at one time point by "superposition" is used to set the interaction and the like between quantum bits for a quantum bit group (Ising model) in which the quantum bits are arranged in a grid pattern, and a control signal called a "transverse magnetic field" is given, and thus the lowest energy state of the quantum bit group is searched. The calculation technique of the quantum gate method uses a calculation algorithm using the properties of quantum for a quantum gate (quantum circuit) in which the properties of quantum mechanics are incorporated in a logic gate used in the classical computer.

CITATION LIST

Patent Documents

Patent Document 1: Japanese Patent Application Laid-Open No. 2017-138760
Patent Document 2: Japanese Patent Application Laid-Open No. 2006-331249

SUMMARY

Technical Problem

For example, the calculation technique of the quantum annealing method is said to be suitable for solving combinatorial optimization problems, while it is not possible to perform general-purpose calculations. However, it is not possible to reach the minimum value due to the hardware limitation, and thus, in the calculation technique of the quantum annealing method, only an approximate solution is obtained. Further, the calculation technique of the quantum annealing method has a problem that it is necessary to match the actual combinatorial problem with the objective function of the Ising model.

On the other hand, in the calculation technique of the quantum gate method, the quantum circuit is not easy to be treated as the Boolean algebra being one of the logic gates used in the classical computer, and the mechanism of the quantum gate is unknown.

The present invention has been made in consideration of such circumstances, and an object of the present invention is to provide a novel quantum gate as an oracle that exists with a quantum idea based on the concept of an N-dimensional unitary space including a complex space, by introducing Riemannian geometry being non-Euclidean geometry in an N-dimensional Euclidean space, and simultaneously expanding the frame of the space. The quantum oracle indicates a quantum gate having 2 inputs and 2 outputs.

Solution to Problem

In order to solve the above-described problems, a quantum gate according to the present invention is characterized by being used for a quantum computer operation using an operator having a simultaneous calculation characteristic of simultaneously performing a plurality of calculations.

Further, the quantum gate includes PPT indicating a proposition, CON indicating converse, INV indicating inverse, ANT indicating anti, MU indicating nothing, $MGN_+$ or $MGN_-$ indicating infinity, and KU indicating fluctuation.

Further, the simultaneous calculation characteristic is targeted for attribute determination, continuous quantity calculation, separation quantity calculation, and wave-like function output.

Further, the operator indicates fluctuation of a wave nature and a particle nature of quantum. The operator outputs a wave-like function in which an attribute and a time axis are converted, when a spatial continuous change amount and a separation quantity are simultaneously input.

Further, a quantum computer according to the present invention is capable of performing a quantum computer operation by using the quantum gate described above.

Advantageous Effects of Invention

According to the present invention, it is possible to provide a novel quantum gate as an oracle that exists with a quantum idea based on the concept of an N-dimensional unitary space including a complex space, by introducing Riemannian geometry being non-Euclidean geometry in an N-dimensional Euclidean space, and simultaneously expanding the frame of the space.

BRIEF DESCRIPTION OF DRAWINGS

FIG. 1 is a diagram summarizing a Neumann type logic gate and a quantum gate of the present invention.

FIG. 2 is a diagram for describing a concept of simultaneous calculation of continuous and discrete quantities.

FIG. 3 is a diagram illustrating a design of a logical symbol (Mitsuyoshi operator) used for the quantum gate.

FIG. 4 is a diagram for describing definitions of logical symbols of an operation instruction for simultaneous calculation of continuous quantity and separation quantity.

FIG. 5 is a diagram for describing an engineering principle and an output in an operation.

FIG. 13 is a diagram for describing the converse-Riemann sphere.

FIG. 14 is a diagram for describing zero division in the converse-Riemann sphere.

FIG. 15 is a diagram for describing a relationship between the anti-Riemann field and an inverse-Riemann field.

FIG. 16 is a diagram for describing an inverse-Riemann sphere nested model.

FIGS. 39(*a*) to 39(*d*) are diagrams for describing geometric definitions of converse and inverse.

FIGS. 41(*a*) to 41(*c*) are diagrams illustrating geometric suitability of origin orthogonality.

FIG. 52 is a table for describing the definition of the anti.

FIG. 53 is a table showing the quantum gate calculation in PPT, CON, INV, ANT, MU, MGN₊ or MGN₋, and KU below.

DESCRIPTION OF EMBODIMENTS

Figure 6:
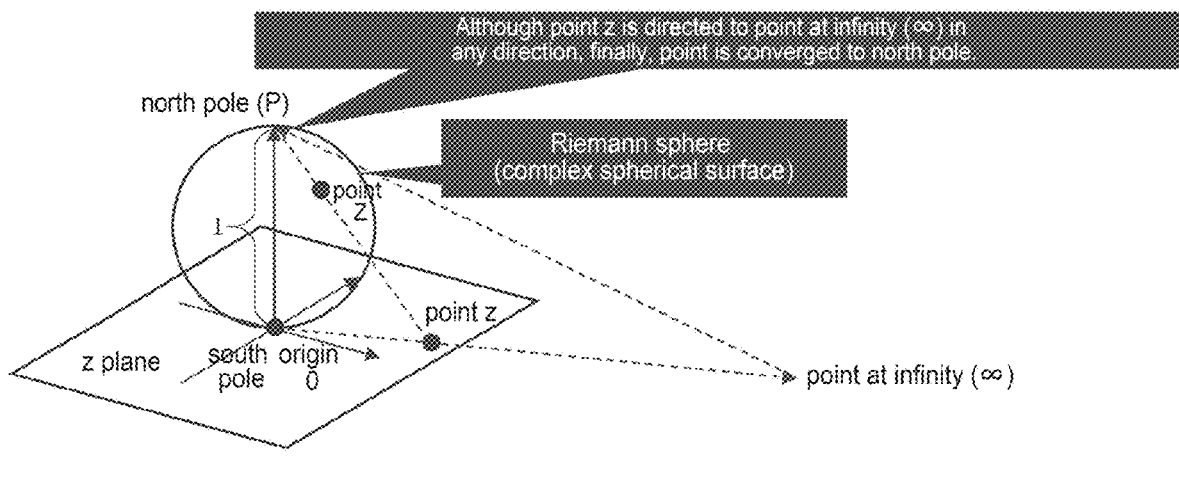
FIG. 6 is a diagram for describing a Riemann sphere.

In recent years, quantum computers have been attracting attention, but a "quantum gate" corresponding to the logic gate of a normal computer does not deviate from the known Neumann computer principle and does not have a gate setting that makes the best use of quantum characteristics. Thus, the applicant devised a non-Neumann type "quantum gate" that fully exhibits and controls the quantum characteristics of uncertainty (see FIG. 1).

In order to realize such a quantum gate, the applicant further expanded the calculation function of the "Mitsuyoshi operator" announced in 2006, and devised so that it is possible to simultaneously calculate the spatial continuous change amount and the separation quantity for the input. Thus, it is possible to output a "wave-like function" converted to a time axis. With the newly extended function for the "Mitsuyoshi operator", the introduction of Riemannian geometry, which is non-Euclidean geometry, in N-dimensional Euclidean space is the basis. Thus, the space frame is further expanded, and a "quantum gate" that exists in a quantum mechanical idea based on the concept of an N-dimensional unitary space, which is a complex number space, may be obtained. This "quantum gate" can be utilized in many fields such as calculation control of quantum computers and three-dimensional Euclidean space.

<Function Newly Extended for Logical Symbol (Mitsuyoshi Operator) Used for Quantum Gate>

FIG. 2 illustrates a model that symbolizes the engineering function of how to treat discrete quantities (such as concepts and thoughts) that are to be calculated simultaneously with the continuous quantities of gradation. This model is a model that simultaneously measures and calculates continuous quantities and discrete quantities in engineering. In FIG. 2, the symbols A and B are attribute symbols, which are the concept number and the discrete separation quantity (discrete number). Further, in FIG. 2, the symbols x and y indicate physical quantities (such as weight, length, and volume). The physical quantity is a continuous quantity.

Here, the point to be noted is the synchronization characteristic of the slider illustrated in FIG. 2. The sliders need to be synchronized in order to perform measurement and calculation of the continuous quantity of the relative state simultaneously with measurement and calculation of the discrete separation quantity of the absolute rule. Thus, the applicant designed a symbol symbolizing the movement of the slider in 2006 (see FIG. 3).

As illustrated in FIG. 3, the symbol $\Omega$ is a new symbol for an operation instruction. The applicant set the name of the symbol to the Mitsuyoshi operator. The meaning of the symbol is "moving between A and B". As illustrated in FIG. 4, when the Mitsuyoshi operator is used as a logical symbol or an arithmetic operator, the Mitsuyoshi operator functions as means for performing dynamic calculation based on a boundary for dividing the continuous quantities between A and B at a ratio of x:y and means for performing discrete calculation by transformation into concept numbers or symbols such as 0 and 1 by establishing a boundary that separates A and B.

For example, if the fluctuating functional characteristic f is derived from signal processing or the like in the natural field and, as a result, the fluctuating function is set as a function h, the function h=f(x).

For example, in the typical calculation principle, a specific method for simultaneous calculation of the concept number and the continuous physical quantities has not been established. Therefore, as a unique engineering method, the structure of slider synchronization and simultaneous calculation of the continuous quantity and the separation quantity is defined (see FIG. 5).

<Specific A $\Omega$ B Operation Method>

As illustrated in FIG. 5, if an operation instruction symbol is replaced into a scale in the operation A $\Omega$ B, the scale targets the weight that is a physical continuous quantity. Thus, x and y go onto the plates of the scale. The conceptual symbols A and B correspond to the movement of the scale rod. Thus, the position of the state $\Omega$ in which the weights of x and y compete with each other is defined as the standard for A and B competing with each other, and A and B are determined from toward which A or B the rod leans. In FIG. 5, the quantity of y increases and the standard line is lowered to a B determination area. Thus, the output of the operation A B becomes the discrete result B at x: y being the continuous quantity ratio of A and B.

Since this calculation principle is generally a simultaneous calculation of linear (Analog) and discrete (Digital), it is called a non-Neumann type calculation principle as opposed to the conventional Neumann type calculation principle of the binary method of Digital calculation. Also, if the Feynman's matrix vector and Fourier series transformation are learned, it can easily be understood that the rail part of the operator is considered as a matrix and the slider is considered as a vector in the actual calculation, so it is easy to know that the vector is energy. Understanding of the tensor field is also quick. It can be understood that in scalar>vector>tensor, the Mitsuyoshi transformation for calculating the energy field is performed by converting the tensor into a vector as a transformation such as a Fourier series transformation. In addition, in the calculation principle shown in the "spacetime calculation concept in the anti-Einstein field" which is an advanced form of this operator, phase transition by zero breaking from the three-dimensional relationship between the two operators has been described by division into functions sets of the slider vector and the handle part.

<Description of TOE Axiom Using Extended Function of Mitsuyoshi Operator>

In Einstein's theory of relativity, a three-dimensional projection of a point on a two-dimensional complex plane onto a three-dimensional sphere is technically used. In particular, 1/0=∞ can be interpreted smoothly. In other words, when the point at infinity extends infinitely to the north pole on the surface of the Riemann sphere, it is interpreted that the intersection of the point at infinity on the sphere and the line connecting the north pole overlaps with the north pole. However, it is possible that this merely describes that "infinite actions are infinite". Also, since the diameter 1 of the Riemann sphere is mathematically interpreted as the distance from 0 to ∞, if this is set as X, and this is divided by zero, this explanation purely solves the problem that X disappears. There is no solution by division by zero because it is not done. Alternatively, the solution is supposed to be infinite. In this case, gravity becomes infinite at zero distance, and it has been pointed out that there is a contradiction and collapse in the second law of thermodynamics "energy conservation".

Therefore, the converse-Riemann sphere and the inverse-Riemann sphere are assumed, and an anti-Riemann field using the converse-Riemann sphere and the inverse-Riemann sphere is considered. For example, "Converse", "Inverse", and "anti" are defined and used as logic. Then, this logic is used to derive an anti-Einstein field with a new operation. In other words, when anti-0 [0=>1] is used as the sign of emergence, the applicant used the function as a means for the Mitsuyoshi operator to simply connect the quantum theory and the theory of relativity, and derived the hypothesis that (0=∞)=1 is established.

At this time, it was mathematically proved that the Mitsuyoshi operator=(0=∞)=1 (everything). This makes it possible to compress the diameter of the Riemann sphere at zero distance and obtain the zero distance, making it possible to express the white hole irradiation state from the black hole beyond that. With this operator, it is considered that the functions "ANT", "CON", and "INV" that connect physical quantum theory and relativity are combined with the quantum gates are used for "MU", "KU", "MGN(+)", and "MGN(−)" of quantum computers.

TOE (Theory of Everything) does not exist at this time. In other words, there is no theory that simultaneously explains the quantum theory and the general theory of relativity in the gravitational field. Therefore, the applicant showed that the quantum theory and the Einstein field are connected by the Mitsuyoshi operator by simply controlling "spacetime" without contradiction, and that the entire universe has a structure of (0≡∞)=1. This can be considered that the applicant explained in the Schwarzschild solution (one of the exact solutions of Einstein's formulas) that division by zero that Einstein could not do, and what happens to gravity in a case of a zero distance from the center of gravity, and time and space are never less than the minimum possible unit (probably about the plank length). Therefore, regarding a general solution that it may be considered that there is no physical quantity called "zero distance", 0=∞ is derived from the zero division by the Mitsuyoshi operator, the direct line from 0 to ∞ of the Riemann sphere is compressed, and the zero distance is calculated by the Mitsuyoshi operator. Using this as a black hole gate, the gate opened and the theory of phase transition to a white hole is constructed. This shows the structure of the universe when it is observed from the outside of the universe. At the same time, it also shows the possibility that the existence outside the universe is created by the emergence sign anti-0. On the other hand, there is a phenomenon called "spontaneous breaking of symmetry" proposed by Yoichiro Nambu in 1961. According to Nambu's theory, it has been confirmed that a symmetrically energetically stable physical system transitions asymmetrically. In addition, a low energy state and a phenomenon called "pair production" are also known.

Based on the two phenomena, the applicant proposes a Klein Bottle-based hypothesis to approach the TOE. In the Klein Bottle, the front-back relationship is reversed in two dimensions at the base of the bottle. Therefore, pay attention to the neck of Klein bottle and examine the relationship between the path and the front/back.

Question 1: Is there a twist like the Mobius loop at the neck of the Klein Bottle?

Question 2: Is there an effect of a reversal at the neck of the Klein Bottle?

If the reversal formula of Question 2 is defined, the problems can be solved at the same time. First, "anti" is defined as a combination of the converse and the inverse, such as the relationship between a matter and an anti-matter. Then, a new operator is used to connect the converse and the inverse. At this time, the reversal formula is assumed to be a new symmetric system. In this system, like pair production, the empty set and ∞ correspond to empty-to-empty and anti-∞, respectively.

In this symmetric system, it is assumed that "emergence" is a phenomenon in which a symmetrically energetically stable vacuum generated by the pair formation of "empty set: anti-empty set" moves to a system that is symmetrically low in energy. Here, the Einstein field becomes asymmetric, but in order to conserve the total energy of everything, the stable vacuum becomes symmetric in the anti-Einstein field. Then, when an emergence symbol that generates 0 to 1 is $$\forall \alpha \in C^* - \{0\}, \alpha \times \infty = \infty \times \alpha = \infty \qquad (1)$$

defined and the generated 1 is regarded as the existence of everything based on the mathematical system, it is understood that the pair generation formula is basically the concept of the same numbers as a number system (N-ary notation).

On the other hand, the decimal operator is a concept for counting human things. The double slit experiment will be described below using a new operator applied to the converse calculation formula of Question 2. In this hypothetical process, we first assume that the anti-Riemann sphere is a nested model, and that the converse-Riemann sphere and the inverse-Riemann sphere are geometric models. At this time, two spheres are connected by the same new operator in order to mathematically limit "converse and inverse" to one field.

As illustrated in FIG. 6, on the Riemann sphere surface, ∞ is the reciprocal of 0 (see Formula (1) below). Thus, division by zero is converted to infinite integration, and as a result, conversion as "∞×X=∞, and thus, X/0=∞" is performed. Thus, it can be interpreted as 1/0=∞. However, h(z0)=0 simply means that "infinity has become ∞". Therefore, the applicant thought that "if you diverge to the infinite point, it will be infinite in itself".

Figure 7:
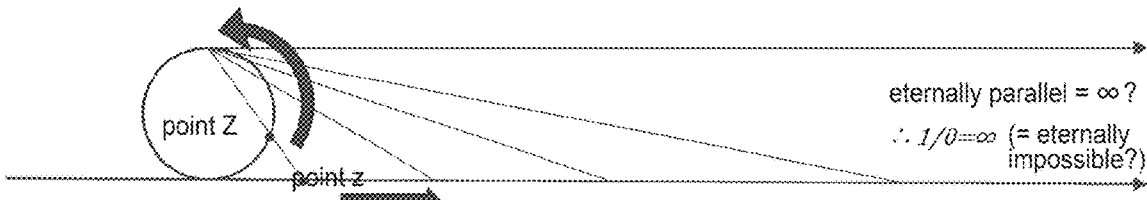
FIG. 7 is a diagram for describing that the Riemann sphere describes that "infinite actions are infinite".

That is, as illustrated in FIG. 7, the Riemann sphere does not merely describe that "infinite actions are infinite".

<Anti-Riemann Field>

The Einstein field is a limited physical range (Riemann field) under the Riemann sphere condition. Also, the anti-Einstein field is a limited physical range (anti-Riemann field) under anti-Riemann conditions.

That is, Question 3 as follows arises.

Question 3: in the Riemann sphere (Einstein field), the division by zero that results in ∞ (1/0=∞) is explained by projection using spheres and lines. What is the projection?

Figure 52:
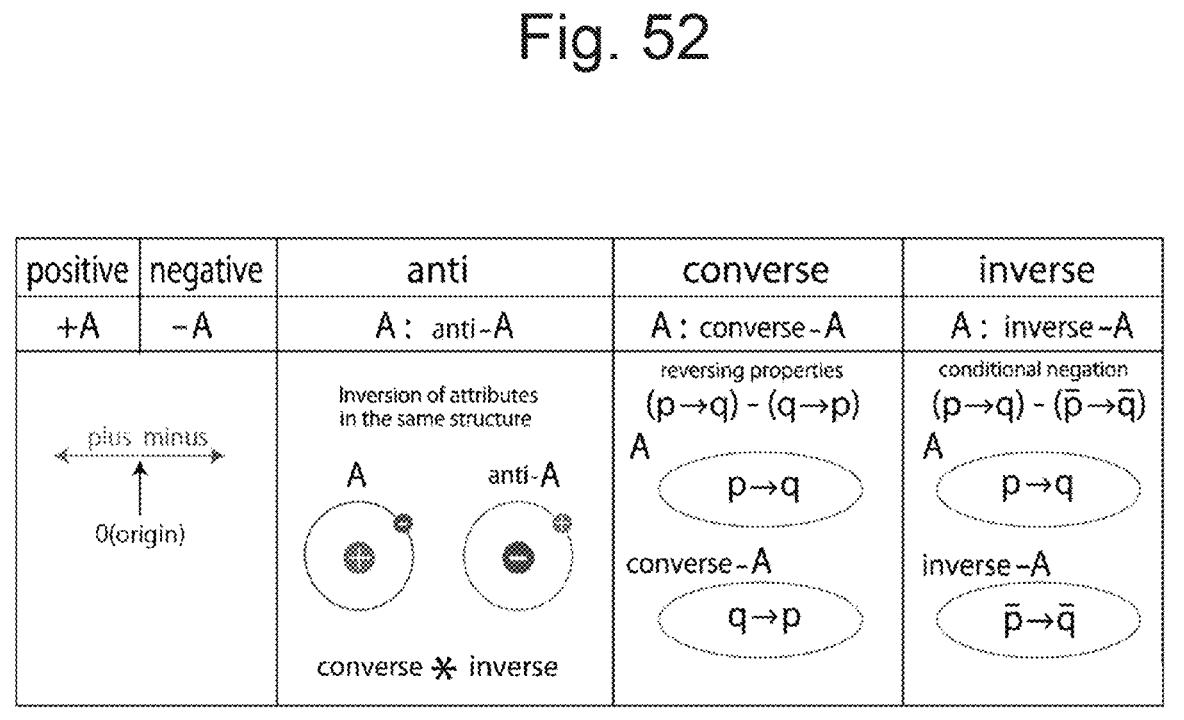

First, consider expressing the relationship between a matter and an anti-matter as an "anti" relationship, as shown in FIG. 52. For example, the "anti" of A is anti-A. That is, since the relationship between matter and anti-matter is the anti-matter relationship, anti for A becomes anti A.

Figure 8:
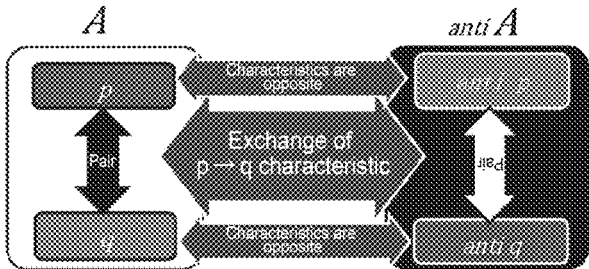
FIG. 8 is a diagram for describing an anti-relationship.

In order to avoid confusion between formulas such as "anti" expressed by the relationship between "matter and anti-matter", "anti" is defined as that "the amount and movement are exactly the same, but the components have exactly the characteristics of the converse". It also becomes a concept of "converse" (opposite position or state without passing through the origin) and negative such as coordinates (see FIG. 8).

Figure 9:
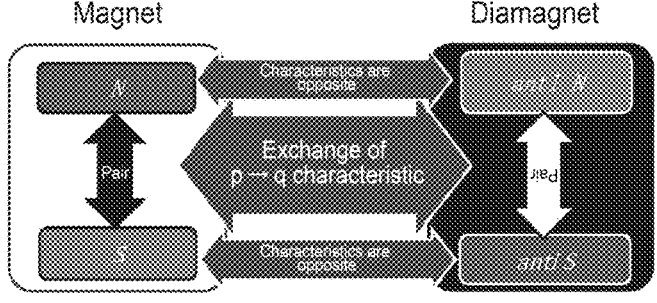
FIG. 9 is a diagram for describing exchange of polar characteristics between a magnet and a diamagnet.

If this is represented by a magnet in an easy-to-understand manner, as illustrated in FIG. 9, the attributes of the north pole and the south pole are inverted.

Figure 10:
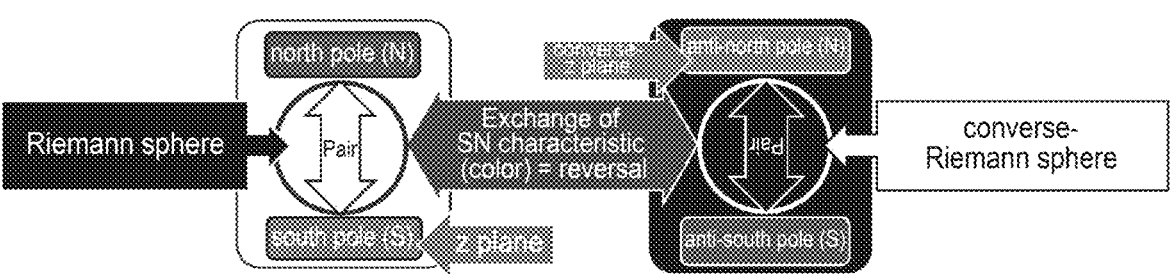
FIG. 10 is a diagram for describing exchange of polar characteristics between the Riemann sphere and a converse-Riemann sphere.

As illustrated in FIG. 10, when the field with the Riemann sphere is the Riemann field and the anti-Riemann field is taken into consideration, the Riemann sphere is upside down. That is, the converse-z plane becomes the anti-north pole of the converse-Riemann sphere.

Figure 11:
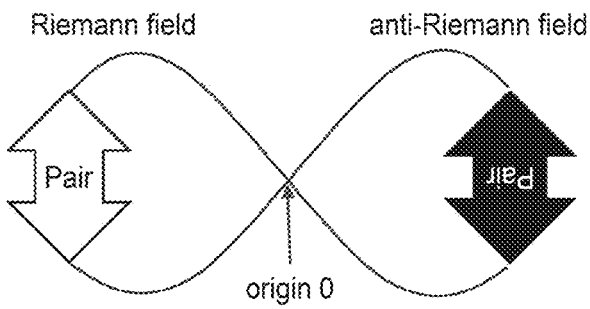
FIG. 11 is a diagram for describing a converse relationship between a Riemann field and an anti-Riemann field.

Further, as illustrated in FIG. 11, when the origin 0 is the base axis, when the converse-Riemann sphere is arranged directly under the south pole which is the origin, the converse-Riemann sphere is converse-mapped by passing through the origin due to the characteristics (color) of the pole. Therefore, as illustrated in FIG. 12, a converse-Riemann sphere in which an anti-south pole is the origin is obtained.

<Converse-Riemann Sphere Model>

Figure 12:
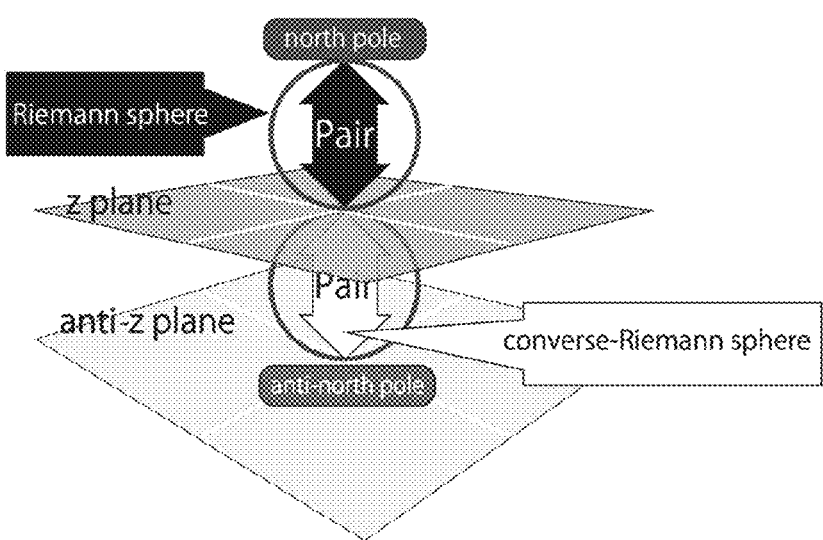
FIG. 12 is a diagram illustrating an arrangement relationship between the Riemann sphere and the converse-Riemann sphere.

In order to assume the converse of Riemann for the anti-Riemann field, a sphere with a diameter of 1 in an opposing direction in which the characteristic of the pole is reversed with respect to the same diameter of 1, as in the relationship of "matter and anti-matter" in contact with each other at the origin (0) in FIG. 12 is considered. Therefore, −1 is not set here.

This sphere is called a converse-Riemann sphere. The point in contact with the origin of the converse-Riemann sphere is the anti-south pole. If a straight line is drawn from the point at infinity to the anti-north pole (A), and any point from the anti-north pole (A) is the converse-z point, the two-dimensional z plane cannot be the converse-z plane, so the characteristics of the pole are reversed. The converse-z plane of the z-plane that becomes the South Pole in Riemann is projected onto the anti-north pole A (see FIG. 13). It can be said that this shifts the phase of the macro of the z-plane to the converse-z plane.

Considering 1/0 of this converse-Riemann sphere, there is a sphere of the same diameter 1 on the complex plane (z plane) just below the Riemann sphere of diameter 1 so as to be in contact at the origin. This sphere is used as the converse-Riemann sphere surface. The upper contact pole (called the anti-south pole) of the converse-Riemann sphere is in contact with the origin (0). On the other hand, the point farthest from the origin (0) is called the lower pole anti P (anti-north pole). When anti P and the point are connected by a straight line to any point on the complex plane (anti-z plane) and the intersection of the straight line and the sphere surface is obtained, anti-z is shown on the sphere surface with respect to the complex number z on the anti-z plane. That is, it can be seen that the points on the converse-Riemann sphere and the points on the anti-z plane are one-to-one.

Then, when the complex number z heads (diverges) to the point at infinity (∞) on the anti-z plane, regardless of the orientation, the anti-z on the corresponding converse-Riemann sphere converges to the anti-south pole, that is, the z plane on the Riemann sphere.

This is the same structure as 1/0 in the Riemann sphere converges to the north pole, but in the converse-Riemann sphere it converges to the z-plane. Further, as illustrated in FIG. 14, division by zero is defined that all points anti Z existing on the complex sphere of diameter (1) where the anti-north pole in contact with the origin (0) converge to the anti-south pole toward the point at infinity (∞), and this is interpreted as 1/0=0.

As a result, division by zero gives two answers, the Riemann sphere and the converse-Riemann sphere. Also, considering what happens if the anti-south pole in the converse-Riemann sphere is back of the z-plane in the Riemann sphere (the plane corresponds to the point), it is considered whether it is necessary to perform interpretation (including that algebraic operations on complex numbers correspond to geometric operations on the Gaussian plane) 0 (point)≡∞ (complex plane at a point at infinity) as a condition for establishing 1/0=0 and 1/0=∞ in the Riemann sphere and the converse-Riemann sphere.

<Inverse-Riemann Sphere Model>

First, considering the inverse side, generally, there are a symmetrical formula and a mathematical interpretation as follows. "Anti" means a relationship between a matter and an anti-matter, and "converse" means a functional reversal by (p→q)<=>(q→p). Considering a converse-Riemann sphere by using this "anti" state as the reversal of the functional characteristic of the anti-matter, 1/0=0 is obtained. Thus, an inverse-Riemann sphere in conditional negation (p→q)<=>(p̄→q̄) being the inverse is assumed.

By comparing the Riemann field and the anti-Riemann field, an inverse-Riemann sphere by an inverse relationship may be illustrated in FIG. 14.

Here, if N̄ is not the N pole, there is a question of whether N̄ is the S pole and whether S̄ is the N pole. In the Riemann sphere, since the argument concerns the surface of the sphere, N̄ becomes the N pole with an inward-facing vector that is not the sphere surface, and S̄ becomes the S pole that is not the sphere surface. As a result, points Z̄ and Z on a plane of inward-facing vectors of the Riemann sphere become the arguments of the inverse-Riemann sphere. At time of {(origin→z plane)→(origin→zplanē)} in the Riemann sphere, only a sphere exists outside of the origin. Thus, it may be considered that the position of the anti-south pole is assumed as {(origin→z plane)=(sphere→anti-z plane)}.

Figure 17:
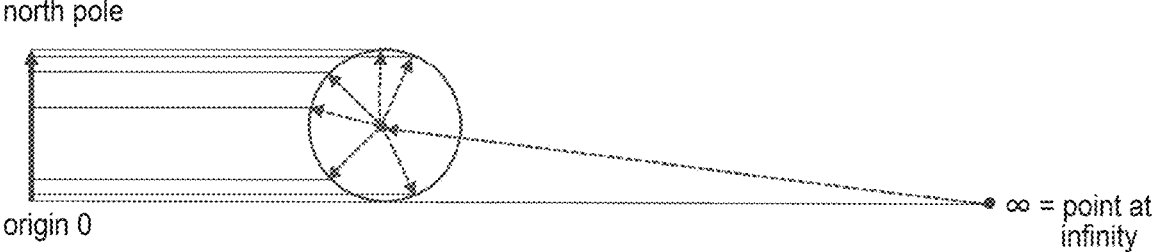
FIG. 17 is a diagram for describing an inverse-Riemann sphere straight line model.

In this case, the anti-south pole is assumed to be on the entire back surface of the sphere, and the farthest point, the anti-north pole, is located in the center of the sphere. This is equivalent to the case where the converse-Riemann sphere is nested. Since the converse-z point overlaps with the intersection with the inverted z plane (B), both the converse-z and the converse-Z overlap at the same time (quantum particleization). In addition, there is a possibility that they exist anywhere on the back side of the sphere surface having a diameter of 1. It is a transition that becomes a quantum (macro) characteristic with the z-plane as the converse-z plane inside the sphere, like the "nesting" that contains the uncertainty of a wave of a quantum. That is, the converse-z is infinitely and freely generated in the range of 1 of the Riemann sphere surface and the converse-Riemann sphere surface (B) on the back side thereof (see FIGS. 16 and 17).

<Converse-Riemann Sphere Nested Model>

Figure 18:
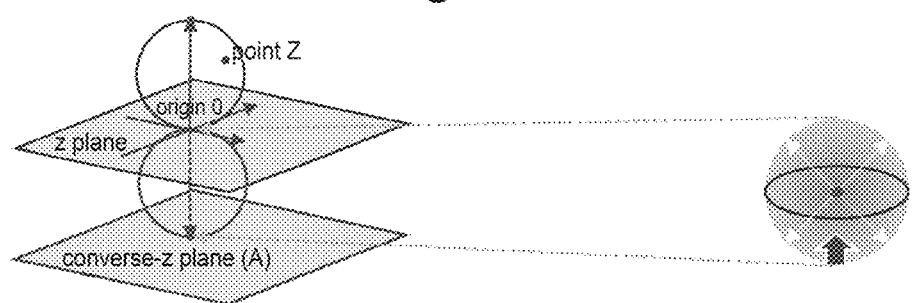
FIG. 18 is a diagram for describing mapping of an inverse-Riemann sphere to the converse-Riemann sphere.

As illustrated in FIG. 18, the inverse-Riemann sphere is fitted to the converse-Riemann sphere previously shown by the applicant. Then, the converse-z point and the converse-Z point are arbitrarily formed at the same time to be infinitely overlap each other at the anti-north pole A and on the back surface of the anti-Einstein field up to the origin. As a result, the converse-z plane of the nest exists infinitely in the anti-∞ of the anti-north pole, and the nest exists from the north pole ∞ to the anti-∞ the anti-north pole (see FIG. 19).

Figure 19:
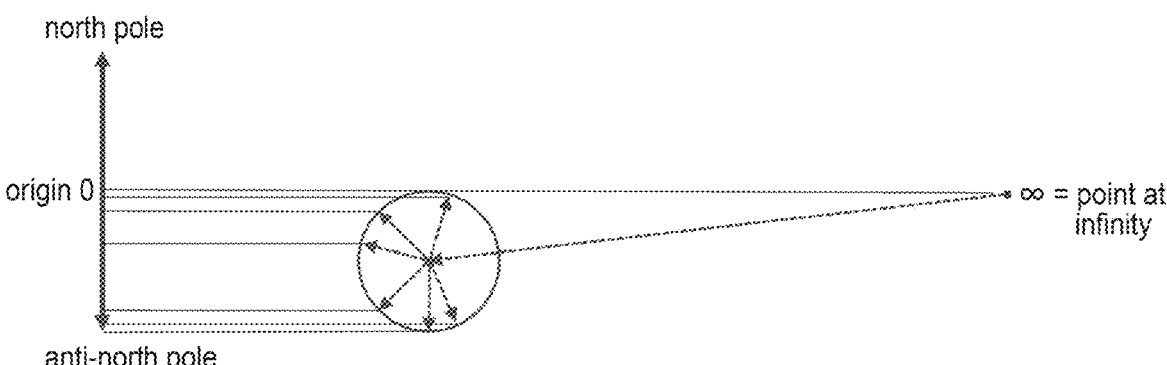
FIG. 19 is a diagram for describing inverse of the converse-Riemann sphere.

Considering this series of flows through the origin, 1/0=∞ on the line (one dimension) may be described by dropping the Riemann sphere (three dimensions) into the complex plane (two dimensions). In addition, if the converse-Riemann sphere is used to set 1/0=0 by dropping from a line to a point in consideration of the drop from the point, the point is grasped as a passing point, and, thus this is assumed. The applicant also considered what would happen to an algebraic operation on a complex number if it corresponded to a geometric operation on the Gaussian plane as a kind of series transformation. When all vector straight lines converge to the origin, there is a moment when all the vector straight lines are orthogonal to each other, and the point becomes nothing (zero) in the extreme state, but at this time, the vectors pass through the origin of each other. Then, a vector is created on the opposite side. If this is the back side of the point, converse mapping as illustrated in FIG. 19 is obtained. Therefore, the following nested model is considered as a gate connecting the Riemann field, the anti-Riemann field, and the converse-Riemann sphere surface.

At time of {(origin→z plane)→(origin→zplanē)} in the Riemann sphere, only a sphere exists outside of the origin. Thus, it may be considered that the position of the anti-south pole is assumed as {(origin→zplanē)=(sphere→anti-z plane)}.

Figure 20:
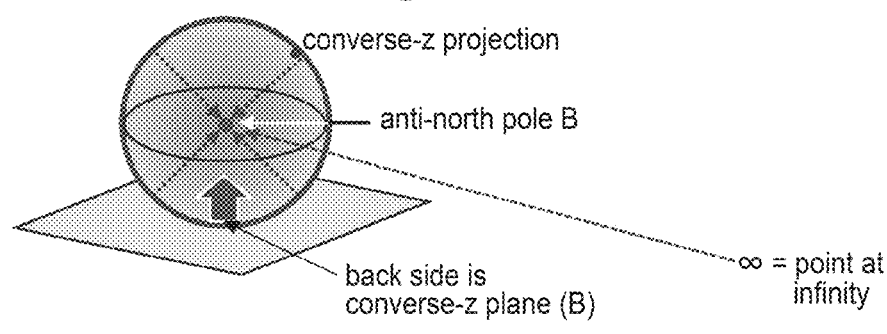
FIG. 20 is a diagram for describing the inverse-Riemann sphere nested model.
Figure 21:
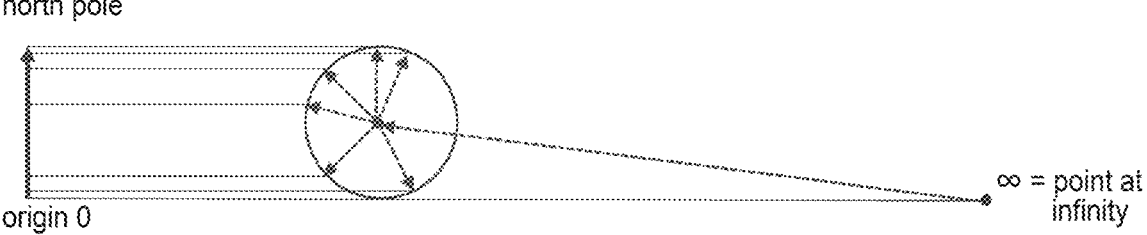
FIG. 21 is a diagram for describing simultaneous overlap in the converse-Riemann sphere nested model.

In this case, the anti-south pole is assumed to be on the entire back surface of the sphere, and the farthest point, the anti-north pole, is located in the center of the sphere. This is equivalent to the case where the converse-Riemann sphere is nested. Therefore, since the converse-z point overlaps with the intersection with the converse-z plane (B), both the converse-z and the converse-Z overlap at the same time (quantum particleization). In addition, transition that the quantum (micro) characteristic with the z-plane as the converse-z plane inside the sphere occurs like a "nesting" that contains the possibility (uncertainty of the wave of the quantum) that it exists anywhere on the back side of a sphere with a diameter of 1. That is, the converse-z in the range of 1 of the Riemann sphere surface and the converse-Riemann sphere surface (B) on the back side of the Riemann sphere surface are infinitely and freely generated (see FIGS. 20 and 21).

Figure 22:
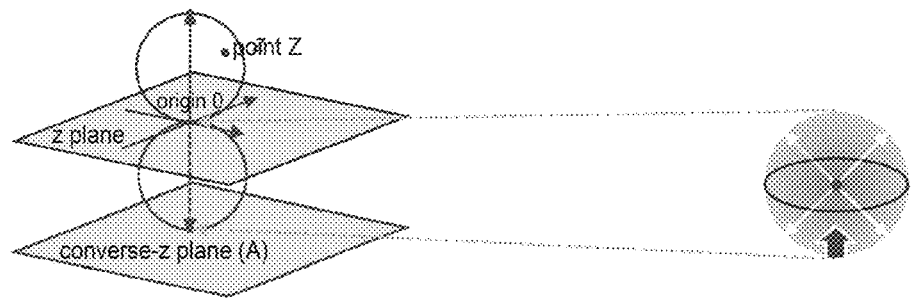
FIG. 22 is a diagram for describing mapping of the inverse-Riemann sphere to the converse-Riemann sphere.
Figure 23:
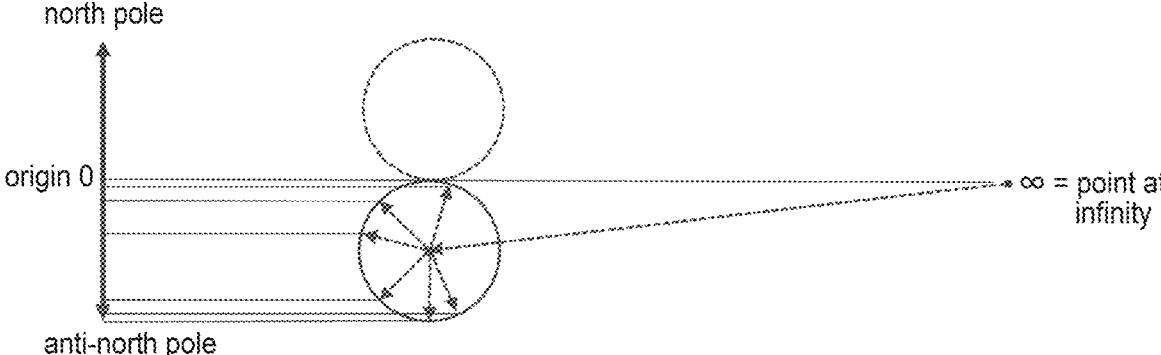
FIG. 23 is a diagram for describing the inverse of the converse-Riemann sphere.

As illustrated in FIG. 22, the inverse-Riemann sphere is fitted to the converse-Riemann sphere shown by the applicant. Then, the converse-z point and the converse-Z point are arbitrarily formed at the same time to infinitely overlap each other at the anti-north pole A and on the back surface of the anti-Einstein field up to the origin. As a result, the converse-z plane of the nesting exists infinitely in the anti-∞ of the anti-north pole in FIG. 20, and the nest exists from the north pole ∞ to the anti-∞ of the anti-north pole (see FIG. 23).

<Anti-Einstein (Anti-Riemann Field) Hypothesis>

Figure 24:
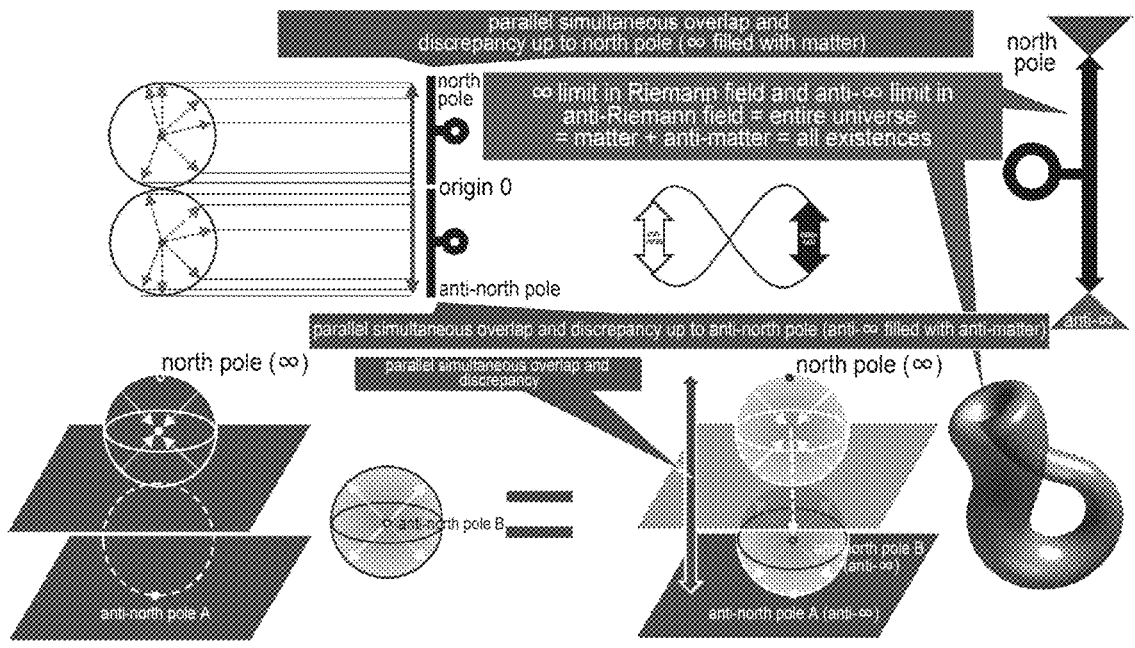
FIG. 24 is a diagram for describing the simultaneous overlap and discrepancy in the anti-Riemann field.

In order to complete the anti-Riemann field with the converse-Riemann sphere and the inverse-Riemann sphere in a nested model, it is necessary to connect these two spheres with logical symbols. Therefore, using the above-described logical symbols, the hypothesis of the anti-Riemann field illustrated in FIG. 24 is considered. The above-described logical symbols will be described below.

<Anti-Riemannian Field Hypothesis Using Operator>

FIG. 24 illustrates the state between the north pole ∞ and the anti-north pole anti-∞ with the north pole model and the anti-north pole model combined, and the image of the state between the north pole ∞ and the anti-north pole in the "Klein Bottle" using an operator. Considering that the north pole (o in the field filled with matter) to the anti-north pole (anti-∞ in the field filled with the anti-matter) can be summarized by operators, it becomes like the "Klein Bottle". FIG. 24 illustrates infinite simultaneous overlap and discrepancy of converse-z planes in parallel.

When anti-Einstein is considered, the applicant first assumed quantum collisions or pair production as the generic physical phenomena and considered for that the energy required for the effect of observation and phase transition in the "Schrodinger's cat" or "double-slit experiment" being the representative problems in quantum mechanics is also caused by "phase transition from equilibrium (phase transition from equilibrium due to a spontaneous breaking of symmetry) from Youichiro Nambu and "pair production".

Figure 25:
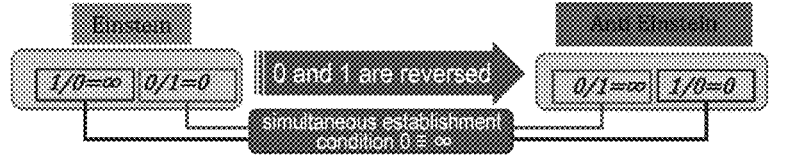
FIG. 25 is a diagram for describing anti-∞={0≡∞}.

If, by deriving this relationship as "observational influence and matter", matter energy enables phase transition to "energy including all kinds such as consciousness, some observation influence, particle collision", it may be assumed that producing 1 (existence) from nothing is anti-0. If the emergent phase transition symbol of anti-0={0=>1} is used, the post-anti-0 is simply assumed as the anti-Riemann field. 1/0=∞ and 0/1=0 in the Riemann field are 0/1=∞ and 1/0=0 if 1 and 0 are considered to be reversed in the anti-Riemann field (anti-Einstein field). Therefore, assuming a transition from the Riemann field to the anti-Riemann field, as illustrated in FIG. 25, the simultaneous establishment condition of 0≡∞ as the gate of the Riemann field to the anti-Riemann field is paralleled to anti-0={0=>1}. This is set as anti-∞={0≡∞}.

In this case, anti-0/1 becomes 1/1 by anti-0={0=>1}, and it is also 1 in the Riemann field. Further, in 0/0 which is not explained in the Riemann field, anti-0/0 becomes 1/0 by anti-0={0=>1}, so that it becomes ∞ in the Riemann field. This made it possible to pass through the gate to anti-0=1. Further, in ∞+∞, which is not explained in the Riemann field, this can be set as ∞+anti-∞, and the limit range of ∞ ("all existing ranges" in FIG. 24) may be set as the "extreme macro".

Figures 26, 27:
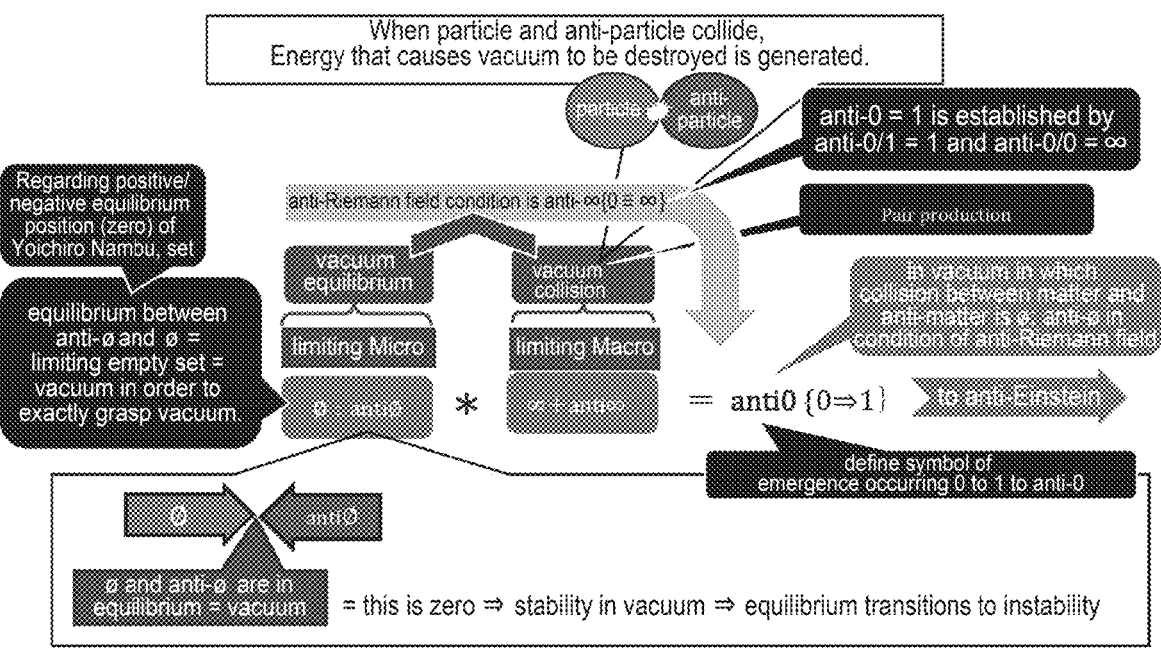
FIG. 26 is a diagram for describing an anti-Einstein hypothesis.
FIG. 27 is a diagram for describing a case where 0≡∞ is considered as geometry.

In a case where it is defined that a huge amount of energy (vacuum is caused to collapse like "collision between a matter and an anti-matter" pair production=what is generated) causes the vacuum to collapse, the zero division in the Riemann field is replaced with this definition, and the applicant independently interprets the encounter (collision) between the ∞ of the Riemann field and the anti-∞ of the anti-Riemann field.
This interpretation is derived from the analogy between ∞-ary numbers and "∞+anti-∞", as shown in FIG. 26. This interpretation can also be explained by the theory of Yoichiro Nambu. Let us imagine a state of zero where the forces are balanced in the "extreme macro" in the microscopic quantum field and the two fixed boundaries between positive (A) and negative (anti-A) are stable in a vacuum. In this case, we can consider the vacuum to be the empty set in the limit state. (Yoichiro Nambu gives us the image of a balance between positive and negative, but here the balance between empty and anti-empty sets and their ratio itself can be defined as the perfect vacuum, or "empty set in the limit state (ultimate empty set)." We then consider that the empty set can be perceived by us, but the anti-empty set is outside of our consciousness.) Therefore, we can assume that zero (the origin) here is the point where the empty set and the anti-empty set are balanced. And the balance between infinity and anti-infinity which are transitioned can be expressed as the ratio {Ø: anti-Ø}, where the anti-empty set is anti-Ø={the same property as the empty set, but the possible properties that should go in the empty set are opposite}. Let us assume that the balance between the properties of the empty set and the properties of the anti-empty set is the balance between two empty sets which are the "empty set as infinite macro" and the "empty set as extreme micro". And, let us assume that the "empty set as infinite macro" exists at a point beyond the "empty set as extreme micro". Then, we can consider the mechanism by which the "properties that should go into the empty set" change to the "properties that should go out from the empty set" based on the balance. Furthermore, we can assume infinity and anti-infinity in the same way. Let us interpret the energy required to unify with {Ø: anti-Ø} regarding "matter and antimatter" or "pair production". In this interpretation, if we assume that an anti-infinity is "the same property (e.g., mass) as an infinity, but properties of a matter in the infinity are opposite," we can deduce the mechanism by which the energy required to unify with {Ø: anti-Ø} transitions from a stable state to an unstable state. In this deduction, 1 as a concept for "existence" emerges by passing through "extreme micro" and "infinite macro" which mean "nothingness (MU, 無) and infinity" respectively. We shall call the emergence caused by these two mechanisms the emergence from the convergence to the origin in the anti-Riemann field. Hence, we need the formula {Ø: anti-Ø}={∞+anti-∞}=anti-0. And the relation between anti-Ø and ∞ or anti-co and Ø is also worth considering in its product, *.

<Anti-Einstein Hypothesis>

The anti-Riemann field and division by zero are explained below as geometric interpretations. FIG. 27 is an explanatory diagram that intuitively and visually interprets 0≡∞ as a geometry.

As illustrated in FIG. 27, an infinitesimal is represented by a square box at the top of the operator on the left, approaching zero. At the bottom, on the contrary, it becomes infinite and large. Summarizing this as a characteristic that seals the tense of the operator, the upper and lower parts are in the same nested state. This is an intuitive image of 0≡∞.

Figure 28:
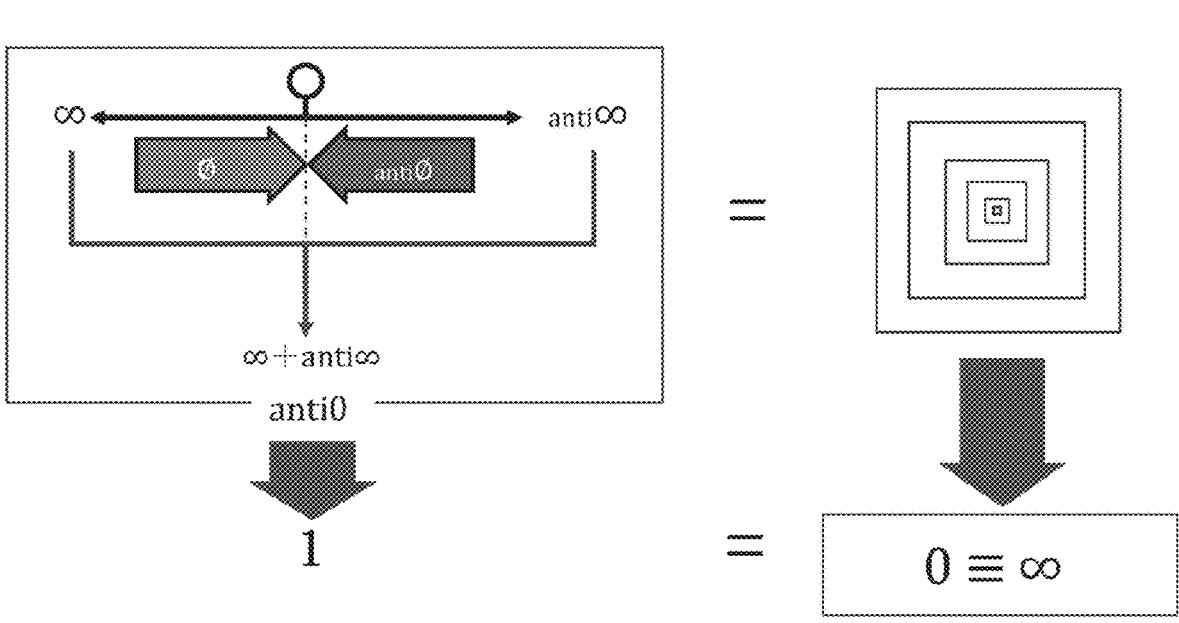
FIG. 28 is a diagram for describing (0≡∞)=1.

On the other hand, if 0≡∞=1, it can be understood by expressing anti-0 using a box as illustrated in FIG. 28 and comparing 0≡∞ in FIG. 27 with 1 which is anti-0.

<Description of Observational Influence of Quantum Problem>

Figure 29:
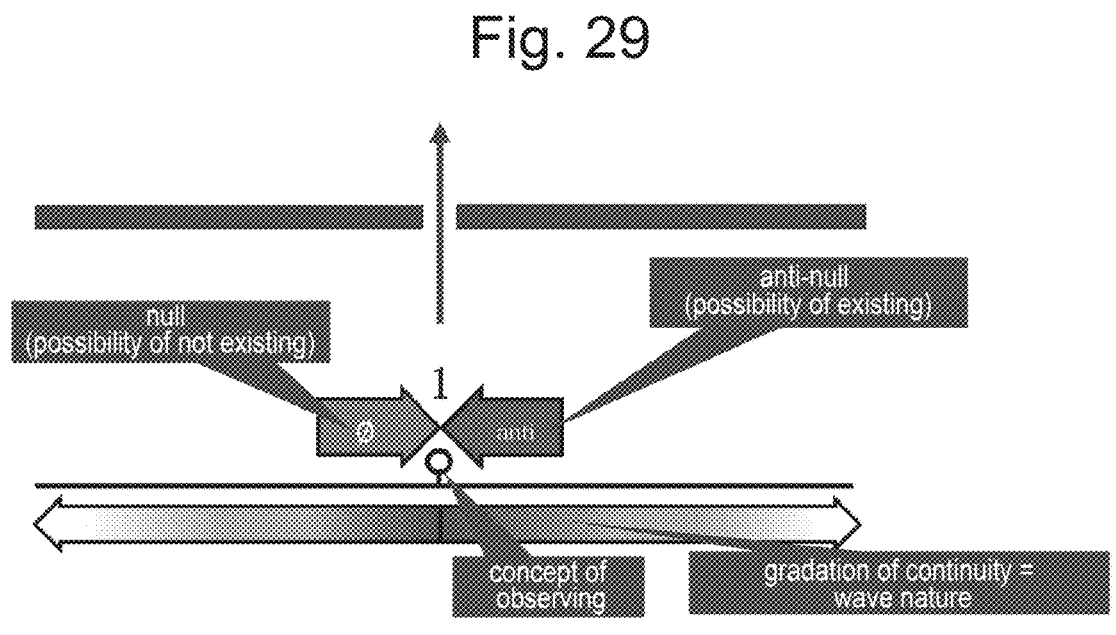
FIG. 29 is a diagram for describing a case where an observational influence of a quantum problem is considered with an operator.

Next, the observational influence of the quantum problem is visualized by an operator, which is illustrated in FIG. 29. Here, an electron-like state passing through a slit is illustrated using an operator. It is explained that when the equilibrium state of the empty set and the anti-empty set is set to the slider position of the operator, that is the anti-0 point and 1 (concept number) is generated. It can be interpreted that this generation causes particles to slip through.

Figure 30:
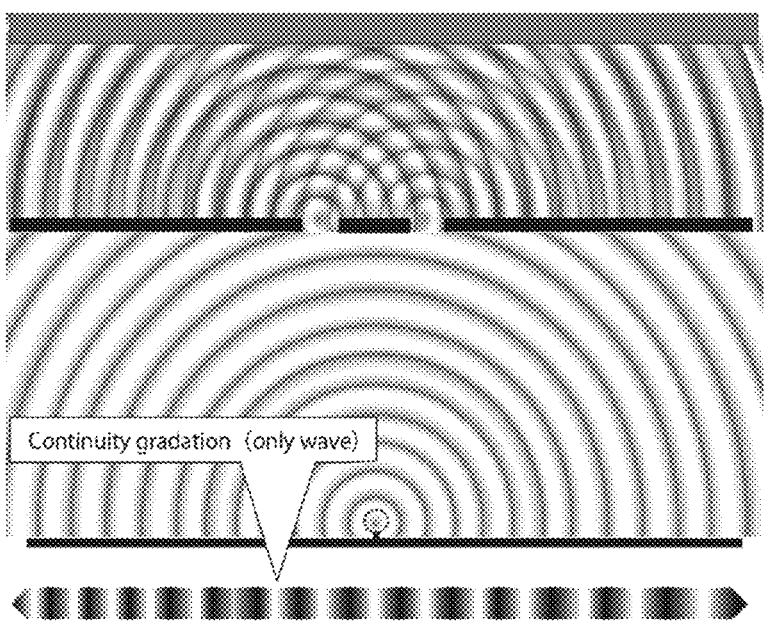
FIG. 30 is a diagram for describing a case where a double slit problem is viewed from a viewpoint of wave nature.
Figure 31:
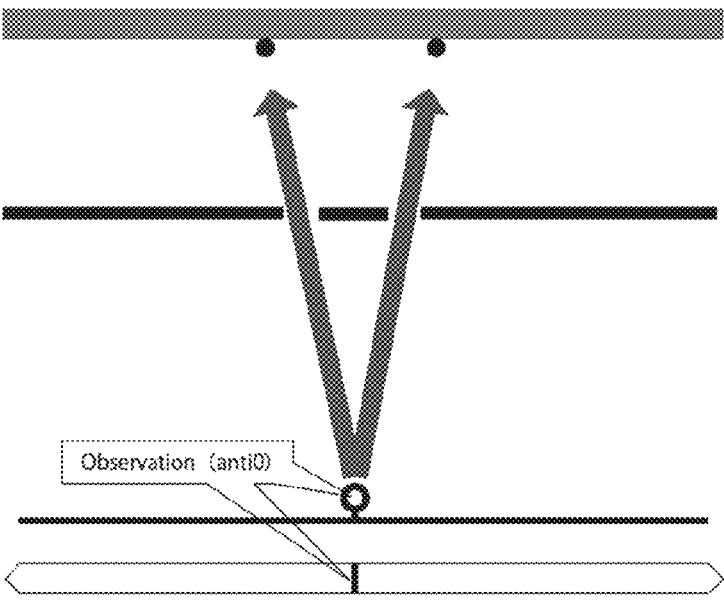
FIG. 31 is a diagram for describing a case where the double slit problem is viewed from a viewpoint of particleization.

Also, in the double slit problem, which is an elegant thought experiment of quantum theory, if FIG. 30 illustrates a state in which the operator slider as an observation concept in FIG. 29 does not exist, it is visually understood that the gradient model of the operator bar may be interpreted as wave nature. Further, FIG. 31 is a diagram illustrating a state of observation in the state of FIG. 29.

<Anti-Einstein Interpretation in Anti-Riemann Field>

Figure 32:
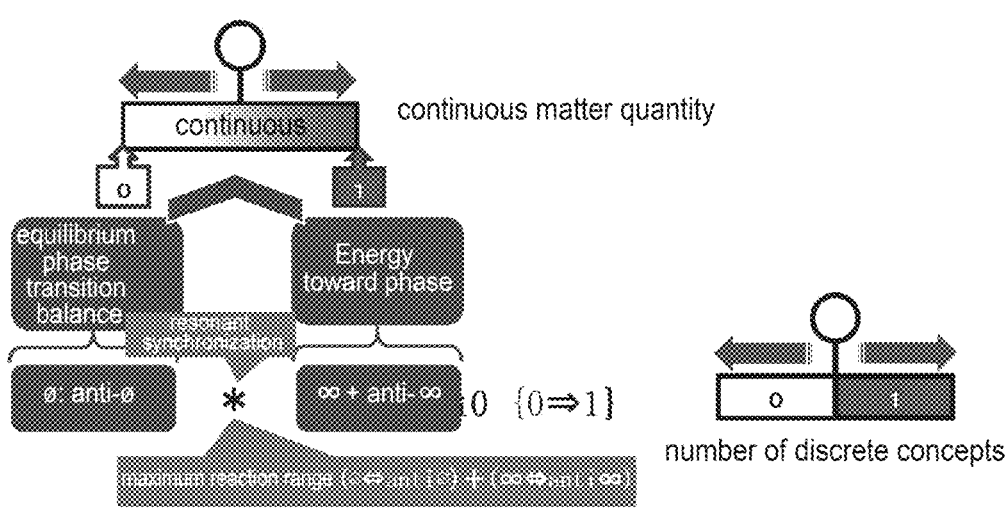
FIG. 32 is a diagram for describing a case of interpreting anti-Einstein by using a Mitsuyoshi operator.

When anti-Einstein is expressed by the operator as "discrete consciousness number" and "continuous amount of matter", it becomes as illustrated in FIG. 32 below.

Figure 33:
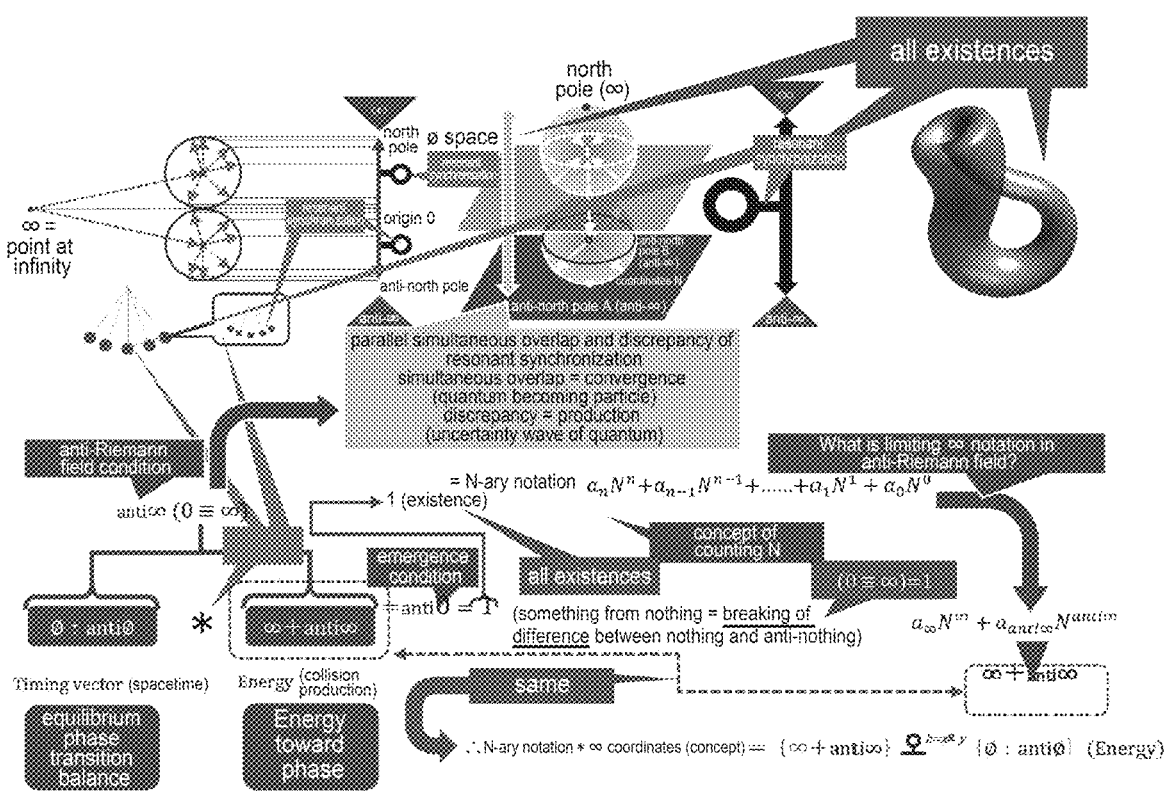
FIG. 33 is a diagram for describing a concept of spacetime calculation in an anti-Einstein field.

When the nested state of the operator of FIG. 32 is explained by the converse-Riemann sphere model illustrated in FIG. 9, it is as illustrated in FIG. 33. The anti-Riemann state, anti-0, is a reaction of Ø: anti-Ø and ∞+anti-∞, which means the infinite overlap of the converse-z plane in the converse-Riemann sphere model illustrated in FIG. 24. In addition, assuming that 0=>1 under the emergent condition anti-0 defined at the beginning is created from nothing to 1, this 1 is grasped by the concept of "existing", and the N-ary notation as the concept of "counting" is adopted. FIG. 33 is a diagram simulating what will happen as an extreme $\infty$ notation in the anti-Riemann field. The structure of the whole figure is a resonance synchronization model, and it is an image that another pendulum is built in the weight part of the pendulum and the two pendulums are synchronized. For anti-0 in FIG. 26, the result of the reaction of Ø: anti-Ø and $\infty$+anti-$\infty$ is (0≡$\infty$), and the range of $\infty$ and anti-$\infty$ by the north pole and the anti-north pole is "all existences". A structure in which the anti-0 condition 1 indicates the whole range of "all existences", covers "all existences", and quantitatively expresses the abstract concept of "all existences"="all existences" is obtained. Here, since the range of $\infty$ and anti-$\infty$, which is regarded as "all existences", can be defined as 1 (exists), this series of nested loops is guaranteed. Here, the important point is that the range of $\infty$ and anti-$\infty$ due to the north pole and the anti-north pole is a nested structure, which corresponds to anti-$\infty$ being the anti-Riemann condition, and the range of $\infty$ and anti-$\infty$ when, as described before, this is regarded as "all existences" by anti-0 being the emergence condition defined at first can be defined as 1 (existence). As a result, by setting 1 of anti-0=1 being the emergence condition defined at first as "existence (all existences)", the abstract concept and the number are integrated. This can means that "the beginning of existence (all existences)" is 1, and the concept of counting here corresponds to "existence", and, within a range of all existence (existence=1), the $\infty$-ary number in the limit of the anti-Riemann field is actually $a\infty \cdot N\text{-}\infty +$ $a_{anti}\infty \cdot N^{anti}\infty$. With this, it can be said that the collision generation energy (breaking the vacuum) of $\infty$+anti-$\infty$ is equivalent to the $\infty$-ary notation numberless in the limit of the anti-Riemann field. (0≡$\infty$) illustrated in FIG. 26 is the condition of anti-0 for the breakthrough of the singular point that causes emergence, and (0≡$\infty$)=1. It should be noted that 1 here is a concept that indicates all existence, so it is the sum of $\infty$ and anti-$\infty$ (1=$\infty$+anti-$\infty$), and the explanation of division by zero in the Riemann field, "infinity is infinite". In the end, it may be similar to the argument, so the possibility that it is valid only under the (0≡$\infty$) condition is only shown. However, the concept becomes the following formulas (2) and (3) under the condition that it is treated as consciousness.

$$N\text{-ary method}*\infty \text{ Coordinate(Concept·Thought)}=\{\infty+ \text{anti-}\infty\}*\{?\text{: anti?}\}(\text{Timing vector·Energy}) \quad (2)$$

$$(\text{Concept·Thought})=(\text{Timing vector·Energy}) \quad (3)$$

Here, the final description of the Mitsuyoshi operator will be made. The addition symbol "+" is an operator that combines a certain thing with a certain thing. The Mitsuyoshi operator is an operator that divides a certain object. As illustrated in FIG. 26, "It is worth considering the relation between (anti-Ø and $\infty$) and (anti-$\infty$ and Ø) in the product *". Based on the idea, in FIG. 33, we can assume a "nested exchange" function by $\{\infty+\text{anti-}\infty\}\ \underline{\Omega}^{\ h=x}\underline{\Omega}^{\ y}\{ø\text{: anti-}ø\}$ in which x=($\infty$·anti-Ø) and y=(anti-$\infty$·Ø).
The reasons are as follows. We need to consider a set of $\infty$ and "things that should go out", a set of anti-$\infty$ and "things that should go in", a set of Ø and "attributes of matter that should be filled", and a set of anti-Ø and "attributes of matter that should not be filled (which could be attributes of antimatter)". In addition, attributes such as "should go out,"

"should go in," "should be filled," and conversely, "should not be filled" would be concepts that allow the present and future to exist simultaneously, and they naturally release the restrictions of tense.

Using $\underline{\Omega}$ also for the correlation between this potential and the Feynman energy in the very micro world, which is "vector potential" important for the concept of momentum, feedback is caused from tense, and the explanation is organized by determining the definition of the potential as a parameter. This may become an interesting future problem.

The same can be said for engineering experiments and their associated molecular biology, neural networks, and neuroscience. For example, in research on artificial intelligence and neural networks, the following correspondence can be considered and it naturally releases the restriction of tense and ensures uncertainty. Concretely, based on the nesting of x=($\infty$·anti-Ø) and y=(anti-$\infty$·Ø) in the equation of "$\{\infty+\text{anti-}\infty\}*\{Ø\text{: anti-}Ø\}$", the correspondence can be considered between Infinity ($\infty$) and "what to do", and it can be also considered between the empty set (Ø) and "what should be accepted". And the correspondence can be considered between the empty set (Ø) and "desire that should be fulfilled", and it can be also considered between the anti-empty set (anti-Ø) and "anti-desires that should be fulfilled". Or the correspondence can be considered between the empty set (Ø) and "desire that should be fulfilled", and it can be also considered between the anti-empty set (anti-Ø) and "desires that have not been fulfilled (including anti-desires) ". In the view of Yasuto Tanaka of the Weitzman Institute, the followings are pointed. "In the Einstein formula, matter=energy, that is, E=mc$^2$, but matter and energy are as different as bosons and fermions. Therefore, the supersymmetry of supersymmetric particles, which is a candidate for dark matter, is wrong. On the other hand, if the "exchange" of nesting" function of the Mitsuyoshi operator described above is applied to bosons and fermions and the difference can be explained, supersymmetry in anti-Einstein by the Mitsuyoshi operator or anti-supersymmetry can be described. The Einstein's formula is mediated by c$^2$. That is, the formula of bosons and the formula of fermion are to be separate, but if the two relationships could be integrated or clearly described by this operator".

<Anti-Einstein Mathematical Model>

Figure 34:
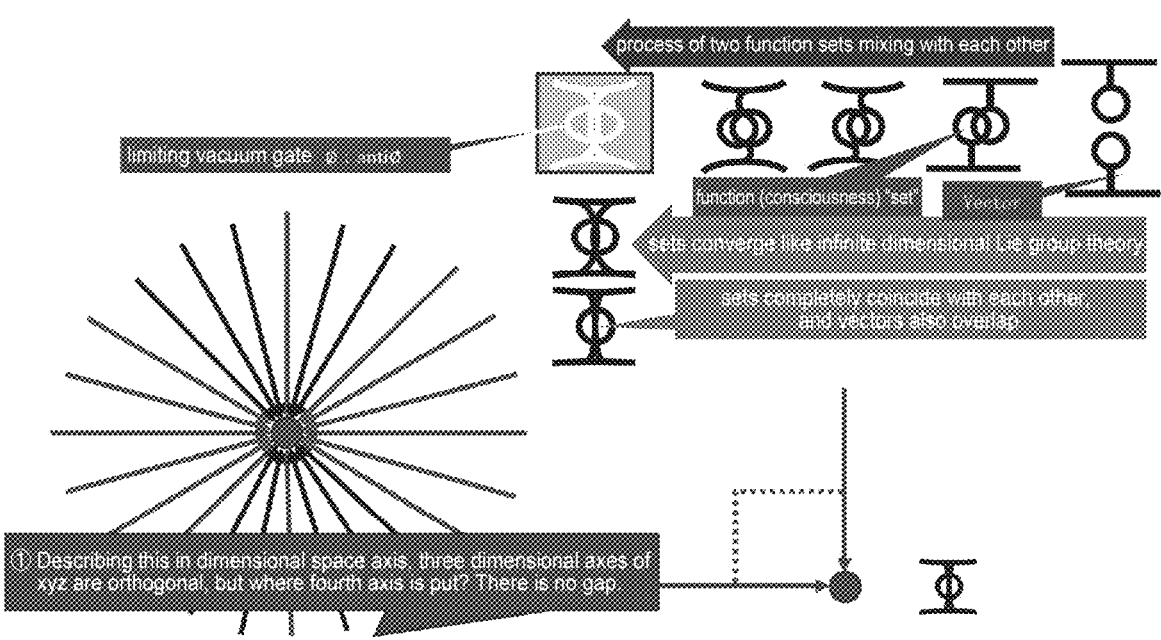
FIG. 34 is a diagram for describing an orthogonal model in duality of zero.

Next, we consider the symbol shown in FIG. 34. This symbol represents the state of balancing and colliding with each other by aligning the two Mitsuyoshi operators up and down in a single symbol. The symbol design represents the state as sum like $\Sigma$, difference like $\Delta$, condensation and emergence. This symbol is combined into one "nested exchange" function by x=($\infty$·anti $\infty$) and y=(anti $\infty$·$\phi$) in $\{\infty+\text{anti }\infty\}*\{\phi\text{: anti }\phi\}$, as a contraposition which is the inverse of the converse of a proposition. With this symbol, h in the head part of the slider lever (function set) results in simplification of the functions of the energy from condensation in the top layer and the emergence as dispersion (divergence) in the bottom layer in (0≡$\infty$)=1 through two combinations of ($\infty$·anti-$\infty$) $\underline{\Omega}^{\ h}$ (Ø: anti-Ø) and ($\infty$: anti-Ø) $\underline{\Omega}^{\ h}$ {Ø+anti-Ø}, x=($\infty$·anti-Ø), y=(anti-$\infty$·Ø) and other free combinations. This is represented by formula (4) as follows.

$$\text{anti } 0=\{\infty+\text{anti }\infty\}*\{\phi\text{: anti }\phi\}$$

$$\{x=(\infty\text{·anti }\phi),y=(\text{anti }\infty\text{·}\phi)\}= \text{⊕ } \underline{\Omega}\text{ ⊛} \quad (4)$$

Figure 35:
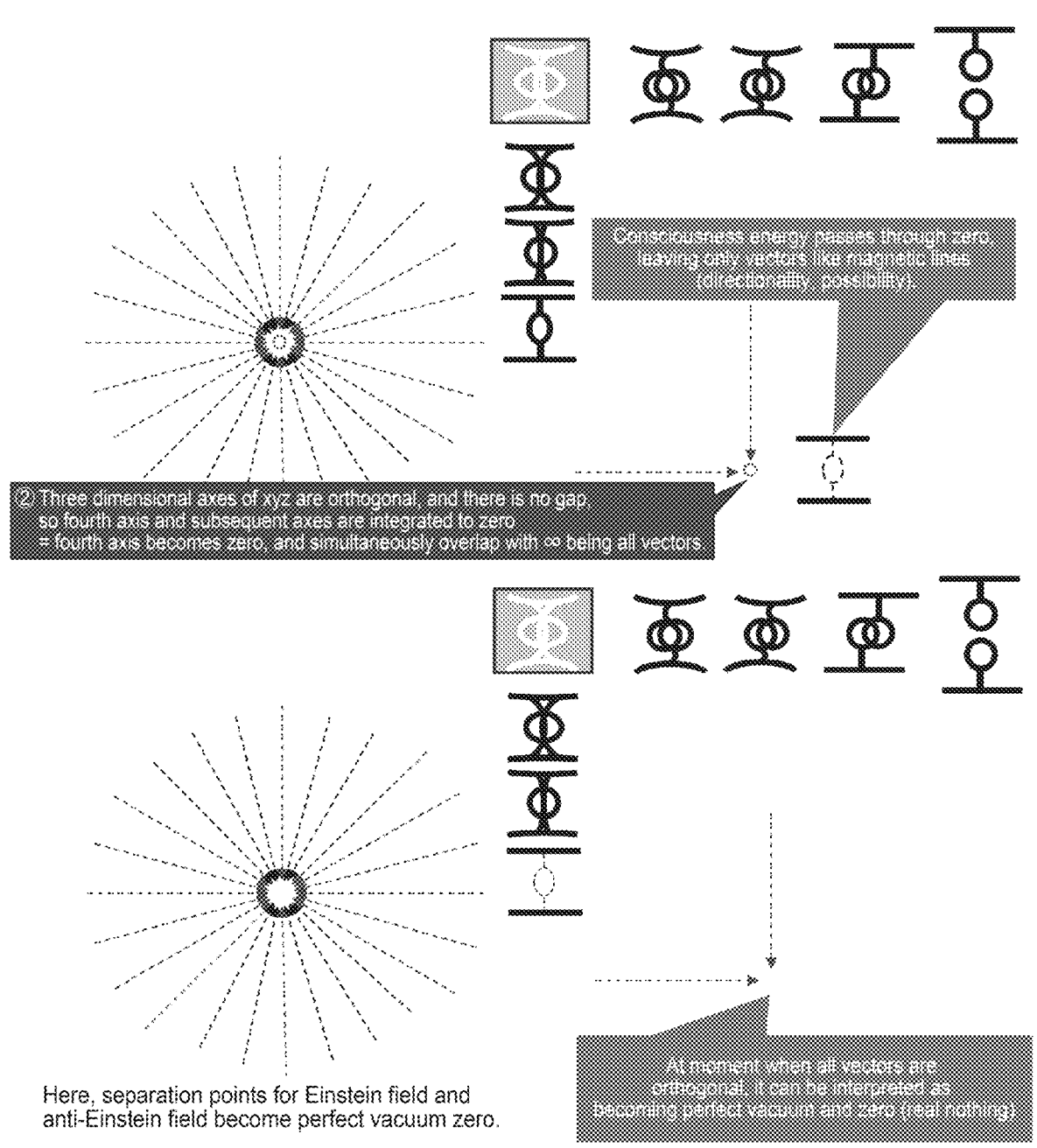
FIG. 35 is a diagram illustrating the orthogonal model in the duality of zero.
Figure 36:
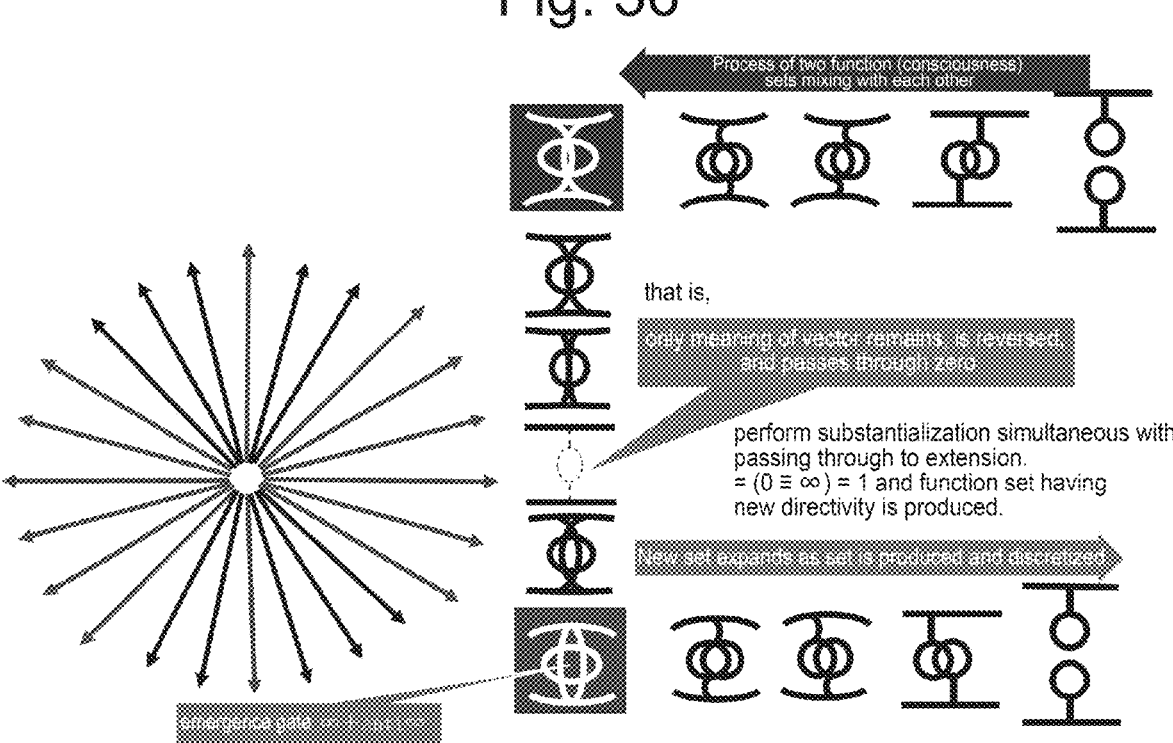
FIG. 36 is a diagram illustrating the orthogonal model in the duality of zero.

Here, the mechanism for the "duality of zero" in FIGS. 35 and 36 is the same as the mechanism for an emergence gate. Thus, continuous state of ⊕ $\underline{\Omega}$ ⊛ will be described.

When all the set of functions converges to "nothingness" zero like infinite dimensional Lie group theory, all vectors are orthogonal at zero, which is the limit state. When that happens, it becomes like a "sea urchin", passing through zero, neutralizing the point, and radiating all orthogonal vectors. Considering the dimensions spatially, the xyz axes are orthogonal to each other. Since there is no margin for inserting the fourth axis there, as illustrated in FIG. 36, the vectors after the fourth axis are aggregated to zero, so that the fourth axis becomes zero as it is, and all the vectors overlap with ∞ at the same time. Then, it becomes 0≡∞, which means overlap. Here, when all the functions lose their meaning and become only vectors, only sharing sprout.

In this process, consciousness energy passes through zero, leaving only a vector like magnetic lines (directionality and possibility). In this case, two function sets mix together and disappear, becoming just a vector. Here, the $\Omega$ separation point between the Einstein field and the anti-Einstein field becomes zero, and the solution is separated as if digitally (conceptually). Meanwhile, at the moment when all vectors are orthogonal, it may be interpreted as becoming a perfect vacuum and zero. Then, only the meaning of the remaining vector is reversed and passes through zero, and materialization is performed simultaneously with the passing onto the extension. This corresponds to the emergence of materialization from concepts with only quantities of passing through zero.

Figure 37:
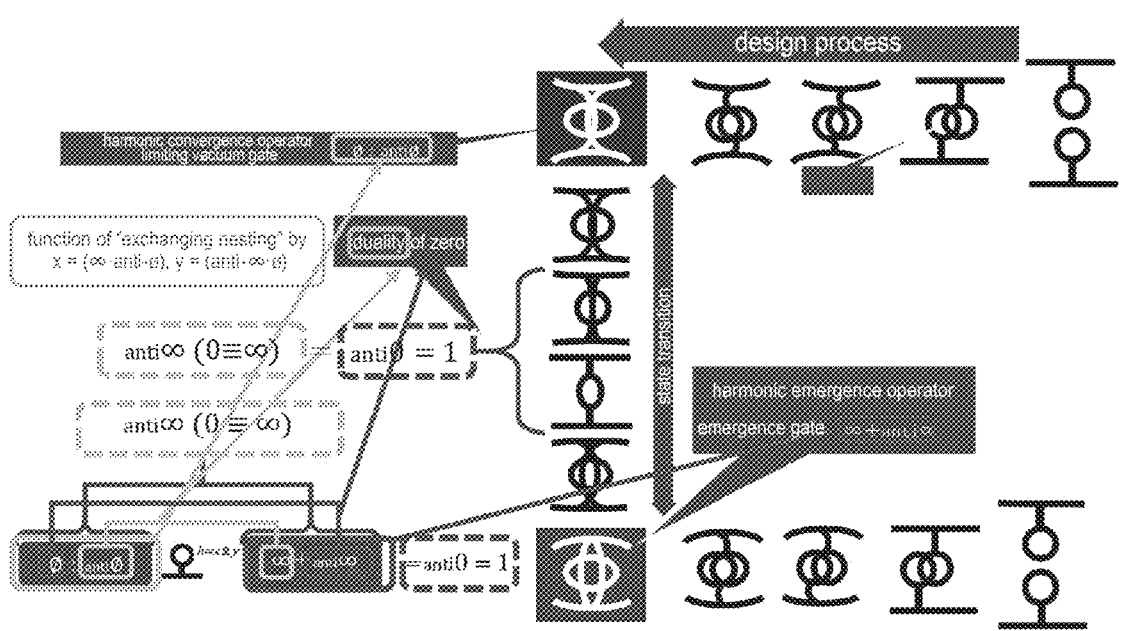
FIG. 37 is a diagram explaining details of a design of a harmonic convergence emergence transition operator.

Once it becomes completely empty, the energy materializes along the reversed vector and the matter is obtained in the opposite direction. If this anti-Einstein is true, the function (wave) as future energy is at the quantum level, and as an implementation of the above formula (4), for example, the converse of the unknown space in the infinite dimensional Lie group, the vector field, and the Riemann space. It may be possible to implement it by some means and execute the harmonic convergence emergence transition operator by function fusion by wave synthesis or interference to generate matter. With this as emergence, if a new concept emerges from the perfect vacuum point of the previous process, it will be established by inverting the attributes like opposing mapping while overlapping at the same time. This is the same "anti-relationship" as the relationship between the matter and the anti-matter. In other words, consciousness becomes only directionality by passing through the limit. Also, since zero exists everywhere and the concept ("awareness" and spirituality) is materialized (acts) everywhere from zero, with this method, the quantum world can be described in macro by using the quantum effect in micro as a transition (emergence) gate to a macro phase as a theoretical physics interpretation. In addition, it is convenient in the explanation of black holes to interpret magnetic force and radiation as directional energy only. At the same time, it will be a hint for emergence of consciousness such as robots. Considering this in terms of quantum number, for example, in a one-dimensional harmonic oscillator in an N particle system, the position and momentum (quantity) can be selected, but the energy eigenvalue En number n (concept) can also be selected. When the position or momentum is selected as the quantum number, the quantum number becomes a continuous variable, but when the energy intrinsic value number is selected, the quantum number becomes a discrete value. Quantum theory can be easily explained by considering the one-dimensional harmonic oscillator as the Mitsuyoshi operator or the harmonic convergence emergence transition operator. In the creation of the universe, it is thought that baryons were generated from the initial state of baryon number 0, and a universe with a positive baryon number was born, but the details are unknown. This may also be explained in FIG. 37.

Figure 38:
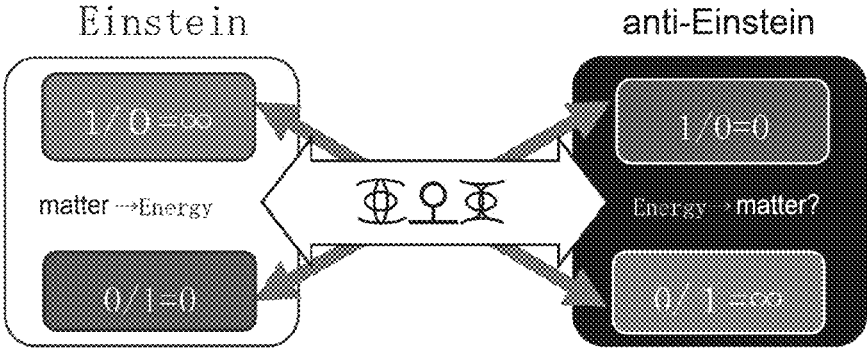
FIG. 38 is an explanatory diagram summarized the anti-Einstein.

Considering the hypothesis of emergent state, 0 to [0=>1] have been defined as symbols that create existence from zero. The "converse" and the "inverse" of the anti-Riemann sphere are also geometrically derived from the original Riemann sphere, which is also used in Einstein's theory of relativity. Then, anti-∞ and anti-Ø are defined, and anti-∞= (0≡∞) is derived. Regarding the derivation, it is shown that the connection between the Einstein field and the anti-Einstein field becomes (0≡∞)=1 by passing through the duality of zero (see FIG. 38). This is called the appearance axiom hypothesis. The Mitsuyoshi operator can be used in the axiom hypothesis that "when zero is equal to ∞, 1 appears as the total energy of the universe". Meanwhile, the applicant has given some thoughts about infinity.

From the above, the applicant has shown that the quantum theory and the Einstein field are connected simply by controlling "spacetime" without contradiction, and that the entire universe has a structure of (0≡∞)=1. This can be said to be the state of observing the universe from the outside. However, at the same time, it also shows the possibility that the existence outside the universe is created by the emergence symbol anti-0. The question is whether or not the outside of this universe is also the universe. The problem is that if the "anti" created by the "converse" and "inverse", which are the overall conditions of the hypothesis, is similar to the anti-matter, it becomes an anti-universe. Whether the anti-universe is also a universe will be an issue for the future.

<White Hole Radiation Principle for Quantum Gate>

Now, assuming a black hole, the white hole can be imagined as the topological transition destination, but in anti-Einstein, the Mitsuyoshi operator is the division principle, so an operator with a new interpretation of multiplication is assumed. There is also the possibility that the continuous quantity is reversed from the separation quantity (concept).

The existence of white holes can be suggested by solving the formulas in the field of general relativity. However, there is no evidence to observe their existence. Mathematically, white holes are unstable and are converted to black holes. As an operation of white hole radiation from a black hole, we introduce the Mitsuyoshi operator, which is a new operator based on the above-described axiom of (0≡∞)=1.

The interpretation of the state before a white hole is formed, which is used in order to derive the definition of "anti" through "orthogonality between converse and inverse" and what occurs in matters falling to a black hole after that will be described below with a geometric approach. The operator $\Omega$ is used in engineering as means for describing the fluctuation of the wave nature and the particle nature of quantum and operates as a quantum gate in a quantum computer. When a spatial continuous quantity and the separation quantity are added as the input, the "wave-like function" in which an attribute and a time axis are converted is output.

As the axiom of (0≡∞)=1, the Riemann sphere is defined as an anti-Riemann sphere in the geometric state of the converse-Riemann sphere and the inverse-Riemann sphere, and this is an axiom that, "when zero has the same value as ∞, the same emergence as 1 which is the sum of the universe is obtained".

Black hole thermodynamics predicts that Hawking radiation will eventually evaporate the black hole. Since this process is symmetric with time reversal, the time reversal solution of a black hole in thermal equilibrium is also a black hole solution. For example, the "definition of anti" is based on the axiom (0≡∞)=1 that appears and is published as an anti-Einstein field, and is derived from the orthogonal relationship between the "converse" and the "converse". These are included in this axiom. In the above-described Mit-suyoshi Axiom, "the relationship between division by zero and the infinity point in the Riemann sphere, which is the Einstein field" is geometrically manipulated based on the "converse" and the "inverse" in the definition of the anti shown in FIG. 52. The converse-Riemann sphere and the inverse-Riemann sphere are obtained, and $(0\equiv\infty)=1$ is derived by the Mitsuyoshi operator.

The time-reversed solution of a black hole in thermal equilibrium has a different interpretation. Explaining a par-ticular observation with a particular model, when a large amount of mass is compressed into a black hole, the obser-vation is made until it is absorbed by surrounding stars and galaxies. However, there is also a side that reaches a specific limit point, shifts its phase, and starts radiation. Interpreting the white hole according to the definition and mathematical explanation, the result is as follows.

a) There is a contradiction that the white hole must already exist before the Big Bang.

b) Since the black hole and the white hole are connected through a one-way wormhole as an extension of the theory that Mr. Yoichiro Nambu once pointed out, the matter sucked into the black hole is released from the white hole. There is also a contradiction that the hypothesis cannot explain what happens to the matter sucked into the black hole afterwards.

With such arguments, a theory assuming that the white hole is an imaginary celestial body created by mathematical interpretation and does not exist in reality is supported. In the present invention, the different approach is adopted. Using the Mitsuyoshi operator $\Omega$ having an independent function of reproducing the quantum motion, in which "[DHU] is $(0\equiv\infty)=1$" based on the axiom, white hole radia-tion is predicted. A new definition that the logical formula is obtained from the geometric structure of "converse" and "inverse" of the Riemann sphere, and an anti-operator are also introduced.

Ordinary operators are mere symbols or strings of sym-bols, which are syntactic, and the corresponding operations are on the semantic side and correspond to functions. This operator has the ability to perform far beyond the normal computational performance limits. It acts as a quantum gate. Its function is used for quantum gates in quantum comput-ers. A quantum gate is a unitary matrix that performs operations corresponding to the operators of quantum opera-tions in a quantum computer. This is realized by using the attribute judgment of the Mitsuyoshi operator, continuous quantity calculation, separation quantity calculation, and simultaneous calculation characteristics of wave-like func-tion output.

It is not simple that such $\Omega$ has the meaning of a logical symbol existing as the theorem proved based on the axiom and the definition, and it is more reasonable to interpret that the operator exists as the axiom from the first. Regarding the conversion in the time axis, the temporal change of the continuous quantity ratio and the change pattern in the unit of time are gradually output as the wave-like function. Simultaneously, the change of the attribute determination result is also added in the same time axis. Thus, in order to utilize the performance of $\Omega$ located at the start point as the axiom, in a three-dimensional Euclidean space as a space in the real world, the concept of anti (theorem of anti) by "straight traveling of converse and inverse" is proposed. In addition, logical symbols (quantum gates) in which a propo-sition is set as PPT, the converse is set as CON, the inverse is set as INV, the anti is set as ANT, nothing is set as MU, the infinity is set as $MGN_+$ or $MGN_-$, a state in which anti-0 of the axiom, which is the final emergence state, becomes $(0\equiv\infty)=1$, that is, fluctuation of vacuum is set as KU are provided. Further, KU will be described below with "2" having a function of simultaneously calculating the continu-ous quantity and the separation quantity and outputting the function. Here, whether or not the black hole or the white hole is the celestial body is not stated. In addition, from a viewpoint of the properties of the axiom, $MGN_+$ or $MGN_-$ is distinguished from $\infty+$ or $\infty-$.

Then, as the next mathematical interpretation of the white hole, "considering a situation before the Big Bang from the theorem of anti, it can be considered that the present universe is emergent by the radiation from the anti-white hole by a black hole in another dimensions".

In this case, a limit sphere in which the matters absorbed to the black hole are condensed to a limit point exists at the center of the black hole. While the center point fluctuates as KU in accordance with the balance change, the vacuum sphere (limit sphere) that becomes perfect at an intersection of moving points ($\Omega$: slider) of $MGN_+$ $\Omega$ $MGN_-$ in KU is obtained, and an empty set sphere in which the inside is completely vacuum like soap bubbles is obtained. At this time, the matters aggregated at the limit point are not diffused in an orthogonal plane from the Riemann sphere in the conventional Einstein in accordance with the theorem of anti, but travel in the complex plane and are radiated toward the white hole.

According to the anti-theorem derived by the applicant, the black hole is turned upside down at the boundary sphere and becomes a white hole. The anti-theorem and the back surface of the boundary sphere become a complex plane and spread over a sphere. This is a developed figure similar to the case where the universe is a sphere, but there is a difference that the theorem of anti exists in the relationship between the front and back. Then, the surface becomes a point on the opposite side of the surface according to the theorem of anti. That is, the outside of the boundary sphere whose diameter is 1 in the axiom formula $(0\equiv\infty)=1$ is outside the limit of the universe to be conscious, and becomes the back and front and back surfaces of the sphere, where it becomes a point. The vector goes straight out of the universe, orthogonal to the boundary sphere. That is, assuming that the inside of the boundary sphere is a positive field, it is considered that white hole emission exists in a vector orthogonal to the surface of the boundary sphere. The explanation of the state in which the complex plane is orthogonal to the white hole and is emitted is first interpreted by a vector with the proposition PPT as 1 in the axiom of $(0\equiv\infty)=1$. The sphere with the diameter of the maximum length is the boundary sphere of "PPT". When INV, $\infty$, CON, and the like are orthogonal to this boundary surface, $\infty$ is created on the opposite side of the origin and the orthogonal point. From the Riemannian geometric features where all vectors are orthogonal at the origin at the center point, orthogonality between CON and INV can be assumed.

The aspect is as follows D and E.

D: At orthogonality between INV and $\infty$, the CON at the origin spreads to $\infty$ like a complex plane.

E: At orthogonality between INV and $\infty$, it extends to $\infty$ on the opposite side of the CON plane of the origin.

In that case, when passing through the origin, it becomes orthogonal E, and in D, it is scattered on the orthogonal plane between INV and CON by the conventional Riemann sphere, but in E, it is considered that an $\infty$ space is emerged on the opposite side. Complex plane orthogonal radiation of a white hole is assumed toward this space.

<Anti-Geometric Structure by "Converse and Inverse" (Theorem of Anti)>

There are the converse and the inverse in the thought. For example, the converse of "If A, then B." exists as "If B, then A.", and the inverse exists as "If not A, then B". Therefore, the applicant made a geometric definition of the converse and the inverse, and wondered what would happen if the two were made orthogonal to each other.

<Geometric Definition (Quantum Gate) of Converse and Inverse>

Consider the proposition PPT "p=>q". The contrapositionCTP "¬p=>¬q" of the converse (CON) "q=>p" with respect to the PPT is referred to as the inverse INV of the original PPT (see FIG. 39(a)).

Then, the CON of the INV and the INV of the CON are as follows (see FIG. 39 (b)).

If p and q have the same value (necessary and sufficient condition), the result is as follows (see FIG. 39(c)).

For the proposition PPT "p=>q", the CON "¬p=>¬q" of the CON "¬q=>¬p" is equal to INV. In this case, for all propositions, the truth and false of CON and INV are the same. This is the same result as definitions of the converse and the inverse of the general proposition (see FIG. 39(d)).

<Geometric Definition of Anti (Quantum Gate)>

Figure 40:
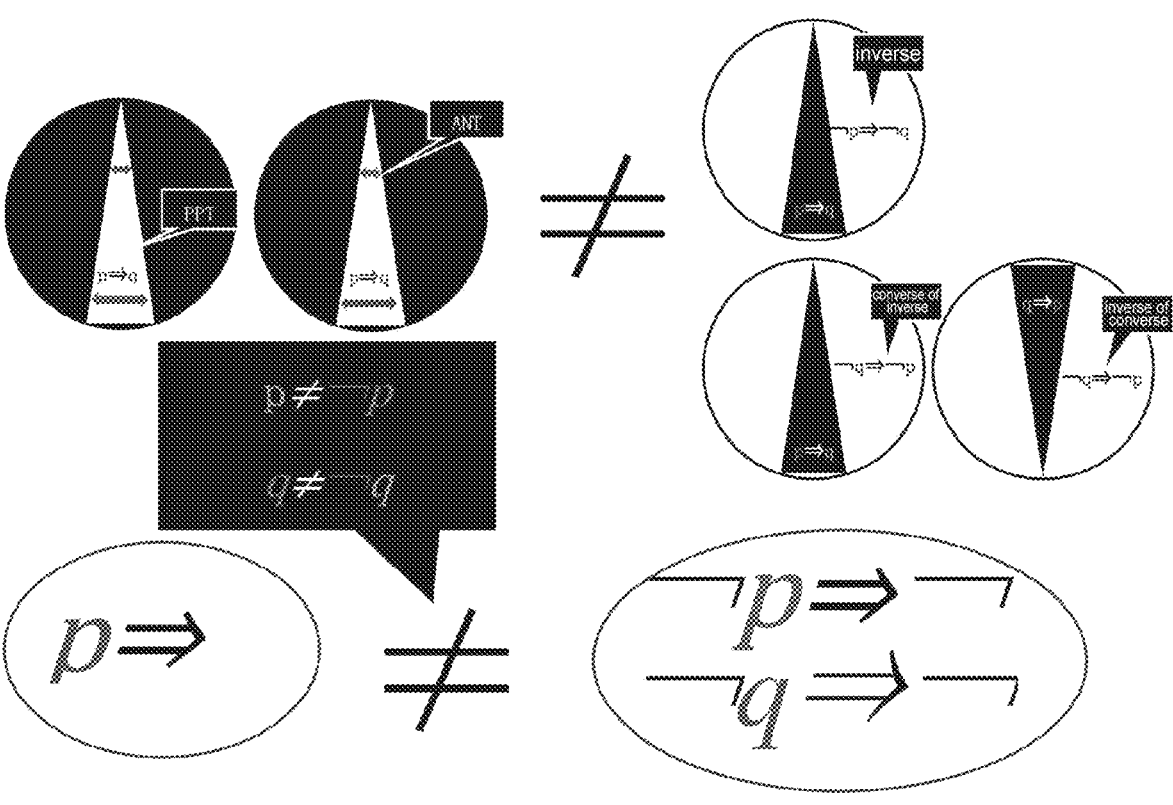
FIG. 40 is a diagram for describing that attribute/function inversion of p and q is defined as anti.

For the proposition PPT "p=>q", if the attribute/function (color/length) inversion of p and q is defined as anti (ANT), it becomes as follows (see FIG. 40).

If the color classification in the proposition PPT "$p_+$=>$q_-$" is rewritten as ANT "$p_-$=>$q_+$", the conditional formula of ANT is expressed by the following formula (5).

$$p_-=>q_+$$

$$(p_-\neq\neg p_+) \& (q_+\neq\neg q_-)$$

$$(p_-=>q_+)\neq(\neg p_+=>\int q_- \& \neg q_-=>\neg p_+) \tag{5}$$

In the case of the formula (1), in the attribute inversion that rewrites the color classification as ANT "$p_-$=>$q_+$", the states of the matter and the anti-matter are very similar to this. Therefore, consider the orthogonality of the CON of INV.

<Definition of Geometric Concepts of MU, MUGEN, and KU (Theorem of ANT)>

The state in which "PPT does not exist" is defined as MU.

$$(q_+=>q_-)=0 \tag{6}$$

On the other hand, regarding the relationship between zero and MU, "is there nothing at all with zero?". However, "is the concept of zero remaining?" is considered. In fact, the symbol zero is not absolutely nothing in Eastern philosophy (a perfect vacuum in which nothing can exist at all). "Zero as a symbol" is a mere reference point for relative cognitive measurement for expressing and recognizing a certain phase, and is characterized by being able to exist anywhere. On the other hand, nothing in Indian mathematics, which is the origin of zero, is "Nothingness (MU, 無) exists", that is, it can be said that the symbol zero is only the cognitive range (closed system threshold) itself "consciousness".

Therefore, the negative (minus) with respect to the positive with respect to the symbol zero is not a physical quantity itself, but a phase quantity that cannot be recognized from the positive position, so it is a transferred movement or a phase quantity. It is the same as the "minus one-yen coin" does not actually exist. Therefore, here, we avoid to use the word "minus" in isolation so that readers does not confuse the coordinate minus (negative) with respect zero and the ANT (anti: meaning that the quantity and movement are exactly the same and the constituent elements have completely opposite properties) and CON, which are represented by the relationship between "matter and anti-matter. 1 treated here is "existing", and 0 is "not existing".

Also, when considering ∞ against zero, there is a state where "there is no limit", and there is a state where "nothing at the minimum limit", which is the converse thereof. Therefore, if these two attributes are collectively referred to as MGN, and "there is no limit" is $MGN_+$, then it becomes ∞, and if "nothing at the minimum limit" is $MGN_-$, then it becomes 0≡∞. The condition is the following formula (7).

$$(p_+=>q_-)=\infty=MGN_+$$

$$CON\infty=MGN_-=(0\equiv\infty) \tag{7}$$

<Geometric Definition of Orthogonal Origin>

Considering PPT as a vector, CON means that the vector is reversed by 180 degrees (see FIG. 41(a)). When the PPTs are orthogonal, the CONs are also orthogonal (see FIG. 41(b)). On the other hand, the intersection with at least two vectors toward the origin is considered to be orthogonal a=b if ab is purely equiangular (see FIG. 41(c)).

Consider the limit near the origin of Cartesian coordinates from the relationship between the complex plane, the north pole of the Riemann sphere, and the point at infinity.

In general, the interpretation of a three-dimensional map based on the idea of mapping a point on a two-dimensional complex plane by a Riemann sphere onto a three-dimensional sphere is as follows.

Figure 42:
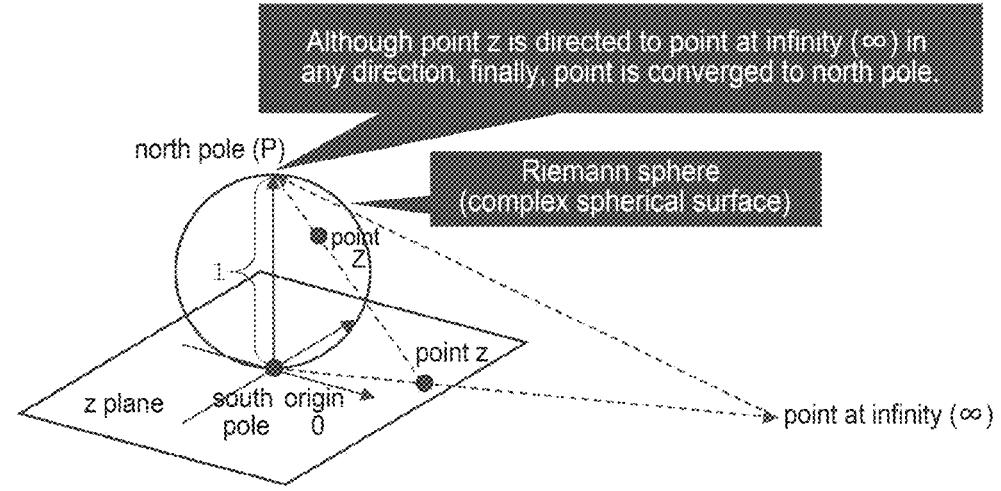
FIG. 42 is a diagram for describing the Riemann sphere.
Figure 43:
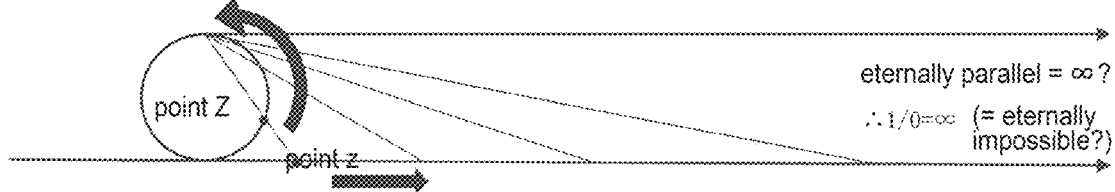
FIG. 43 is a diagram for describing a Riemann sphere straight line model.

First, the Riemann sphere will be described with reference to FIG. 42. As illustrated in FIG. 42, a sphere having a diameter of 1 is assumed to be in contact with the origin on the complex plane (z plane). This sphere is designated as a Riemann sphere or a complex sphere. The lower contact pole (called the south pole) of the Riemann sphere is in contact with the origin (0), and the point farthest from the origin (0) is called the upper pole P (north pole). When the north pole and the point are connected by a straight line to any point on the complex plane (z plane) and the intersection of the straight line and the sphere surface is obtained, Z is shown on the sphere surface with respect to the complex number z on the z plane. It can be seen that the correspondence between the points on the Riemann sphere and the points on the z-plane is one-to-one. Then, when the complex number z moves (diverges) toward the point at infinity (∞) on the z plane, Z on the corresponding Riemann sphere converges to the north pole regardless of the direction. In summary, all of the points Z existing on the complex sphere of diameter (1) where the south pole touches the origin (0) converge to the north pole toward the point at infinity (∞) (see FIG. 43).

Let we interpret that the north pole of the Riemann sphere described above is the origin and all vectors head toward the north pole. Then, when a large number of vectors head toward the north pole, it is asked whether the vector with the north pole as the origin is orthogonal (F) or straight (G) to the origin. In the Riemann sphere with F, the CONs are offset by the orthogonality, only the orthogonality remains, the plane extending at right angles to the PPT becomes the CON of the origin, and the vector is a straight line and cannot pass through the origin.

However, INV is always present within a group. Also, the outside of the group is basically ∞. At the origin, the CON of PPT is only orthogonal, and then PPT disappears and becomes only INV.

Figure 44:
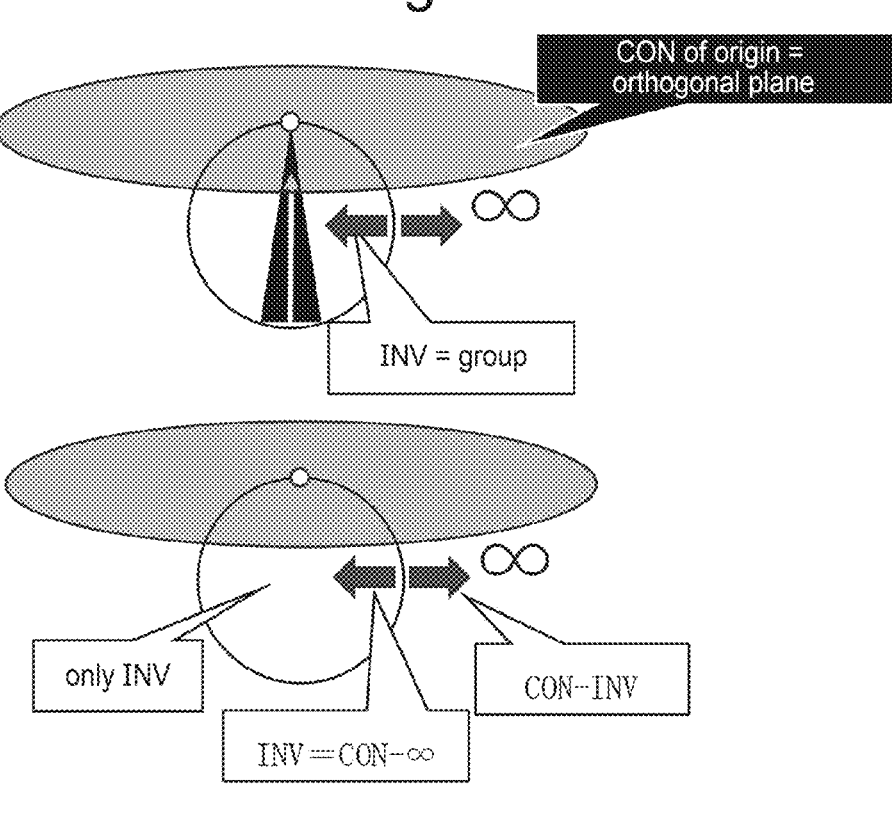
FIG. 44 is a diagram for describing extreme orthogonality.

Considering that this is even if the orthogonality at two points is an infinite number of vectors, the CONs of all the vectors (PPT) toward the origin are aggregated at the origin like the north pole of the Riemann sphere. It can be said that the vector is extremely orthogonal (see FIG. 44).

Figure 45:
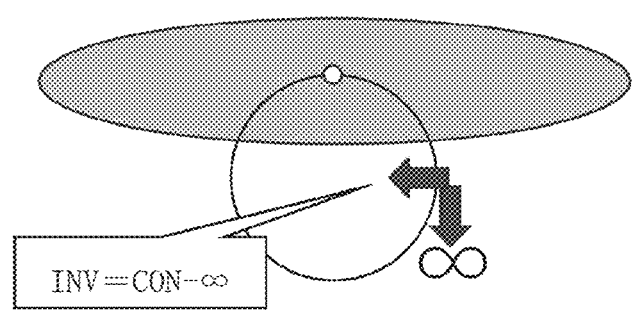
FIG. 45 is a diagram for describing a relationship between INV and CON-∞.

On the other hand, INV is related to ∞ and the group and outside, and can be said to be CON ∞. When this is made orthogonal, it becomes as illustrated in FIG. 45.

Figure 46:
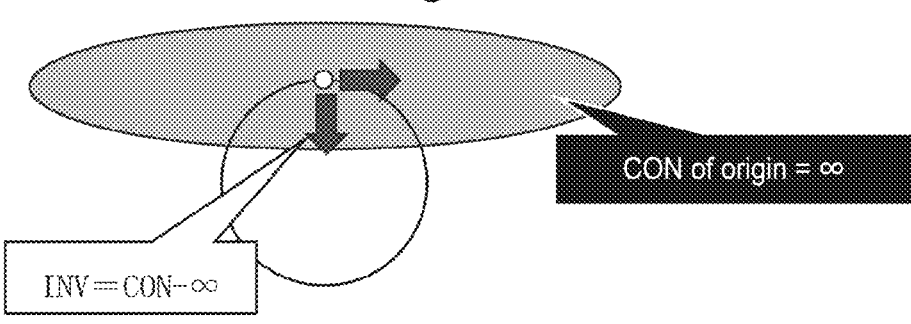
FIG. 46 is a diagram for describing CON≡∞ at an origin.

Since infinity and INV do not matter the directionality, when the vector is moved to the origin, ∞ overlaps with the CON of the origin (see FIG. 46).

Figure 47:
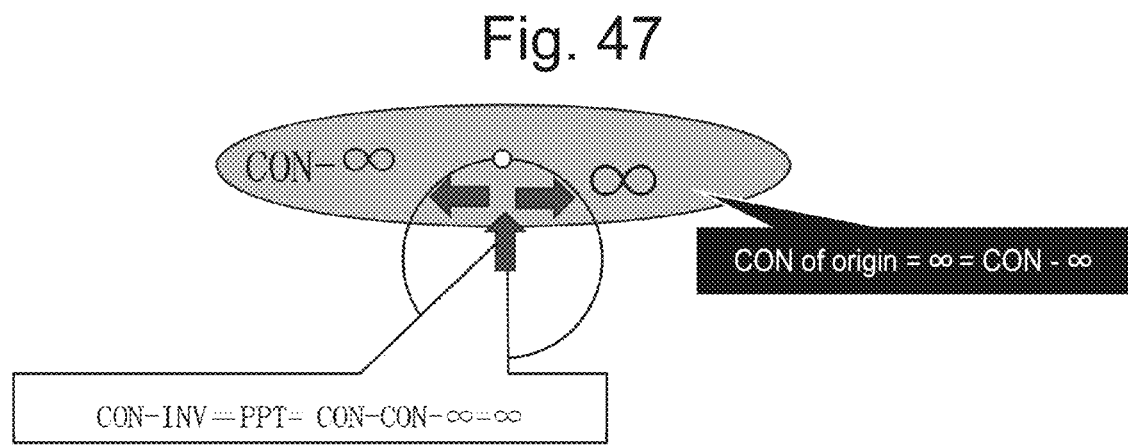
FIG. 47 is a diagram for describing orthogonality between INV of PPT that plunges into the origin and ∞.

Therefore, since the INV is in the direction of CON at the moment orthogonal to the origin, it is interpreted as CON-INV as illustrated in FIG. 47.

That is, when the INV of the PPT entering the origin is orthogonal to ∞, the following formula (8) is obtained.

$$CON\text{-}INV\text{=}PPT\text{=}\infty\text{=}CON \text{ at the origin} \tag{8}$$

Figure 48:
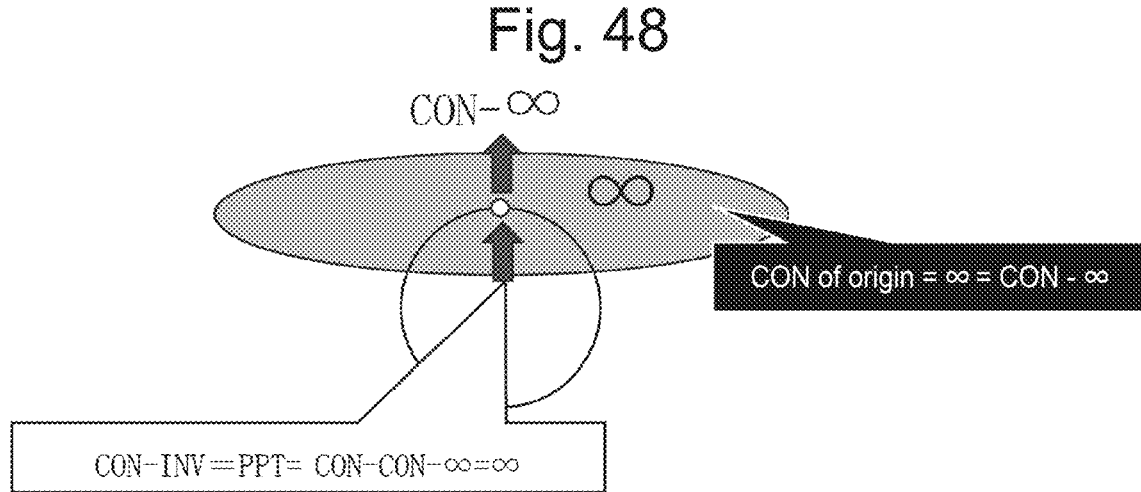
FIG. 48 is a diagram for describing a direct line between INV and ∞.

Then, in the orthogonal (G) of INV and ∞, as illustrated in FIG. 48, the opposite side of the PPT vector group from the origin is also ∞ or CON ∞. The infinite range is everywhere in INV, which can also shake the basis of the Einstein principle that division by zero on the known Riemann sphere is ∞. Therefore, the opposite side of the PPT group from the origin is considered from the sides of orthogonal F and a direct line G.

F) For the orthogonality between INV and ∞, the CON at the origin spreads to ∞ like a complex plane.

G) For the direct direction of INV and ∞, it extends to infinity on the opposite side of the CON plane of the origin as the boundary.

Figure 49:
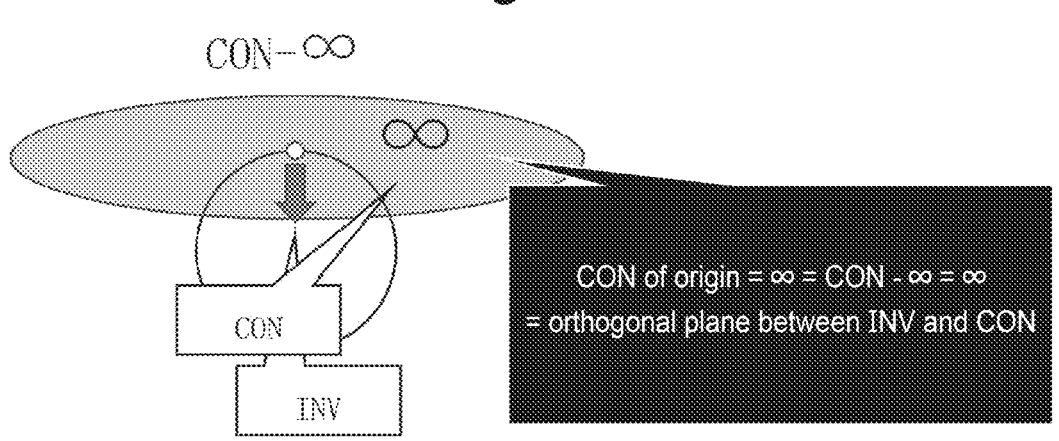
FIG. 49 is a diagram for describing a case where INV and CON are orthogonal to each other.

Then, considering the case where INV and CON are orthogonal to each other, the result is as illustrated in FIG. 49.

When one point to pass is specified by an orthogonal formula, the formula of a straight line passing through ($x_0$, $y_0$) perpendicular to ax+by +c=0 is b(x−$x_0$)−a(y−$y_0$)=0, so CON The formula of the straight line perpendicular to ($q_-$=>$p_+$) and passing through the origin ($x_0$, $y_0$) is the following formula (9).

$$p_+(x\text{-}x_0)\text{-}q_-(y\text{-}y_0)\text{=}0 \tag{9}$$

The formula of the straight line perpendicular to INV(¬$p_+$ =>¬$q_-$) and passing through the origin ($x_0$, $y_0$) is the following formula (10).

$$\neg p_+(x\text{-}x_0)\text{-}\int q_-(y\text{-}y_0)\text{=}0 \tag{10}$$

As a result, the formula (11) is obtained from the formula (9) and the formula (10).

$$p_+(x\text{-}x_0)\text{-}q_-(y\text{-}y_0)\text{=}\neg p_+(x\text{-}x_0)\text{-}\neg q_-(y\text{-}y_0) \tag{11}$$

For the orthogonal A of INV and ∞, CON-INV=PPT=CON-CON-∞=∞ and CON-INV=PPT=∞=the origin CON, so that the orthogonal formula holds when 0=∞. This is the same even if CON and ∞ are orthogonal to each other.

With PPT ($p_+$=>$q_-$), CON ($q_-$=>$p_+$), and INV (¬$p_+$ =>¬$q_-$), PPT is set as the start point $p_+$ and the end point $q_{-(x0,\ y0)}$, and CON is set to a vector from the end point to the start point. Further, INV is a vector from a point ¬$p_+$ which is not a start point to a point ¬$q_-$ which is not an end point. Here, if the group is removed, there is a possibility that ¬$p_+$=¬$q_-$=∞, but the circle in the figure of the group indicates the boundary with ∞. In that case, the direct sphere that maximizes the $p_+$ of PPT becomes the boundary. When INV, ∞, CON, and the like are straight at this boundary, ∞ is created on the opposite side of the origin and the orthogonal point. In that case, when passing through the origin, it becomes an orthogonal G, and in F, it scatters on the orthogonal planes of INV and CON, but in the case of G, it is considered that an ∞ space is emerged on the opposite side. Then, in a case where all the vectors go straight without passing through the origin, there is a possibility that the origin is not a point, but a physical limit sphere. Considering that the vector passes through the surface thereof, the vector, the matter, and the energy are naturally transmitted in opposite directions. This is called a phase transition to the phase and is called a phase transition.

At the boundary of the PPT circle, for ($p_-$≠¬$p_+$), $p_-$ is not the curved surface of a sphere with a maximum diameter for $p_+$, and, for ($q_+$≠¬$q_-$), $q_+$ is not ¬$q_{-(x0,\ y0)}$. If the contents of the exchange of $p_+$ and $p_-$, and the exchange of $q_+$ and $q_-$ are considered in a condition of ($p_-$=>$q_+$)≠(¬$p_+$=>¬$q_-$ & ¬$q_-$=>¬$p_+$), what and how to exchange the phase transition (replacement) is an engineering point.

<White Hole Radiation Using Mitsuyoshi Operator Ω >

The matters aggregated at the limit point are not diffused in an orthogonal plane from the Riemann sphere in the conventional Einstein field in accordance with the anti theorem, But go straight through the complex plane and are radiated from the white hole. With the above-described theorem of anti, the black hole is reversed front and back at the boundary sphere and thus is changed to the white hole. The theorem of anti and the back surface of the boundary sphere become the complex plane to expand the sphere. This is similar to the case where the space is assumed as a sphere. Then a plane becomes a point by the theorem of anti. That is, the outside of the boundary sphere is the outside of the conscious universe and is the inverse of the sphere and the front surface of the front and back, and thus becomes a point. Thus, the vector goes straight on the outside of the universe in a form of being orthogonal to the boundary sphere. That is, if the inside of the boundary sphere is set as the positive world, white hole radiation exists with the vector that goes straight on the front surface of the boundary sphere. In this case, the orthogonal mechanism is required. Such a mechanism will be described with the relationship between the limit sphere and the boundary spheres by the Mitsuyoshi operator Ω.

Figure 50:
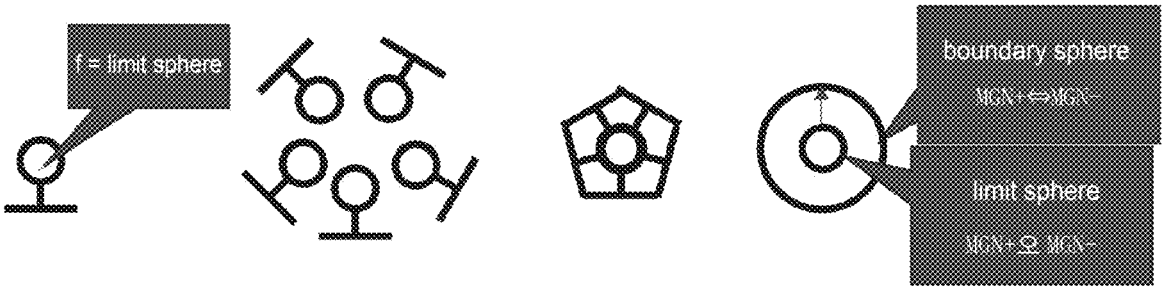
FIG. 50 is a diagram illustrating a case where a direct line is set to a state where a plurality of vectors having a limit sphere of a function as the origin exists in a periphery.

Considering the limit sphere and the boundary sphere by the Mitsuyoshi operator Ω, exchange of the property and function of ¬, exchange of + and − between $p_+$ and $p_-$ and between $q_+$ and $q_-$, and reversal of the vector are considered. The function by the Mitsuyoshi operator Ω first is set as a limit sphere. Since the limit sphere is the origin, a plurality (MGN) of vectors using the limit sphere as an intersection is assumed, and are set as MGN+ Ω MGN−. If a state where a plurality of vectors using the limit sphere of the function as the origin exists in the periphery is set to going straight, this is as in FIG. 50.

At the origin (limit sphere), ∞ and INV overlap on the Riemann sphere. And if all the vectors are orthogonal at the origin, ∞=0. If it is direct, the axiom is (∞=0)=1, so the following formula (12) is used.

$$MGN_+ \ \Omega \ MGN_-\text{=}(\infty\text{=}0)\text{=}1 \tag{12}$$

Figure 51:
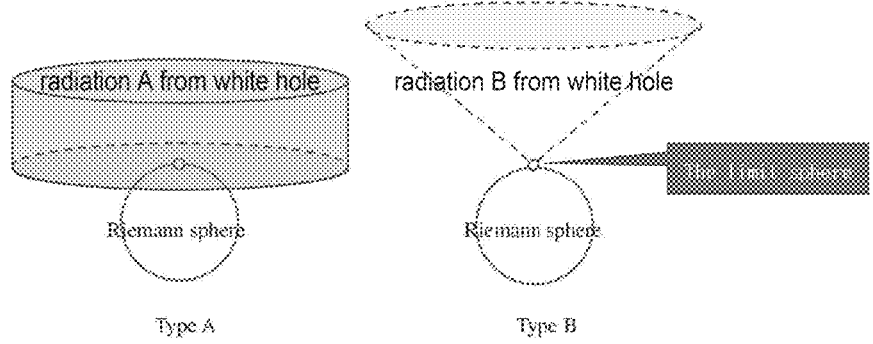
FIG. 51 is a radiation prediction diagram from a white hole.

If the category in an orthogonal formula in phase transition is used as an input, and calculation elements in Ω in which the continuous quantity and the separation quantity are simultaneously calculated and calculation of locking the time in and converting the spacetime into a function is performed are arranged and viewed, there are + and − of $p_+$ and $p_-$, and $q_+$ and $q_-$. There are also the outside and the inside of the boundary sphere, and this becomes the exchange of the property and function of ¬. In this case, vector reversal and the like are considered by using a combination in which MGN+<=>MGN– and MGN+ $\Omega$ MGN– are phase-transitioned, as the phase transition of being orthogonal and going straight, and the theorem is proved by physically finding a material. With the proof of the definition, a physical experiment is performed to derive the theorem. Thus, the direction of the white hole radiation prediction (FIG. 51) is determined.

If a plurality of vectors terminates in a black hole and are defined as electromagnetic waves in extreme states such as the spin and mass of light in the limit sphere, it is considered to have an influence on the attribute reversal of radiation in the anti-universe. In any case, in all combinations, it seems that the theorem of anti can be used as the ANT standard, which is a different condition between the matter and the anti-matter in axioms.

<Quantum Gate of KU>

KU is set by two of MGN+ or MGN–. This means a state of relative and quantum fluctuation and fluctuation of vacuum. Since this is the quantum characteristic itself in a state where the existence that "is infinite and at the same time noghing" exists (set to 1), the operator $\Omega$ is used as the symbol for operating the quantum state, and the condition is formula (13) as follows.

$$MGN_+ \ \Omega \ MGN_-, (\infty \equiv 0) = 1 \tag{13}$$

FIG. 53 shows the quantum gate calculation in PPT, CON, INV, ANT, MU, $MGN_+$ or $MGN_-$, and KU below.

Differentiation is the proposition that comes closest to the origin, and so is the black hole in the Riemann field. A black hole absorbs all matters (electromagnetic waves) toward its center point. As far as it is known, only X-rays (which may be a group of boundary spheres in the text) can be escaped. Taking this center point as the origin, if any vector is orthogonal at the origin, it shows the possibility of spreading to the orthogonal plane as a converse matter. However, when the vector goes direct through the origin, the vector is reversed and penetrates. However, the opposite side of the black hole cannot be confirmed. Instead of the vector, there are questions about what the configuration of the matter is, or whether the matter (mass) is accumulated forever if the matter is preserved. Here, if there is a limit point of the density of a matter within a certain range from a realistic assumption, it is considered that an amount exceeding the limit is repelled.

When that happens, it will naturally leak to the outside of the sphere. Let we set the diameter of a limit sphere of this mass density to 1, which is the sum in the boundary sphere. Regarding the question about what about the vectors (motion trajectory and energy), the vector should try to go straight ahead of the origin. However, black holes absorb matters from all directions centered on the origin. If all orthogonality is $\infty$=INV=orthogonal plane at the origin, the white hole infinite radiation can be explained as CON "q=>p" as opposed to CON "p=>q". If the proposition is matter, INV is the anti-matter. A black hole may or may not swallow the anti-matter. Also, if the INV includes the field, the question about whether or not the black hole swallows the field is considered. If the INV captures the entire field as a group and the black hole swallows it, it can be assumed that another field will be created by passing the origin. In addition, when even the anti-matter is swallowed, the matter and the anti-matter disappear at the origin, but whichever is greater may appear as anti at the phase transition destination.

What is noteworthy here is what the INV and the boundary sphere are. In addition, "what are CON matters and ANT matters?" also arises for a proposition. Also, with regards to "what is the INV of the origin?", the black hole absorbs matters at the origin, so in the black hole the PPT is "out of the origin=>origin (vector intersection)", CON is "origin (vector intersection)=>out of origin" because of its CTP based on CON "origin (vector intersection)=>out of origin" and INV "¬ out of origin=>¬ origin" based on the original proposition. The PPT at the origin of a black hole is the point where all vectors are orthogonal, and all matters are aggregated. The INV will be the mechanism of the limit sphere itself.

In a recent paper [DHU JOURNAL], we disclosed the possibility that this mechanism can be confirmed by the matrix vector (Feynman's energy) called consciousness. However, this is still a development on the quantumthings. Perhaps it may recognize other axes (spacetime as Einstein calls it) only when the frequency and function, the inverse and the converse, and the like are positively orthogonal. In this, it should be possible to confirm even with an orthogonal momentary macro. If black holes and white holes overlap in the infinity of this diversity, they will be balanced and orthogonal to the complex plane that should be orthogonal. It looks like the first law and the second law of thermodynamics. Apart from the third law, it may only look and feel a small part of this field from a special direction.

From the above considerations, the followings are obtained. Using the operator $\Omega$ for establishing the axiom of $(0 = \infty) \rightarrow 1$ as an operation for white hole radiation from the black hole, being orthogonal of the quantum gate in which the theorem of anti by "the direct line of the converse and the inverse" is set as CON and INV is derived. Thus, the interpretation before the white hole is obtained, and it is predicted that the matters absorbed to the black hole are radiated in a boundary of becoming a point on the front surface with the phase transition in a form in which a state of expanding to INV of the boundary sphere is directed.

<Future>

In reality, the limit sphere has unimaginable energy, and exchanges such as ¬ and +–, ¬ and vector, and vector and +– may occur. This can be used as a prediction for future simulations, and can be implemented in emulators and quantum computers to advance to white hole irradiation physics experiments. In addition, there are reports that the anti-matter was actually observed, so it seems that the state of anti is physically mottled. In addition, the relationship between MGN and $\infty$ is also considered to proceed from physical verification.

When Riemann is simulated by some sphere emergence pattern (it is assumed that spheres are emergent in addition to the above F and G, but this is omitted because it is an infinitely divided derivative as in the Mercator projection), the process of infinity becoming with zero and the condition emergent from nothing (0) to existence (1) occur in the anti-Einstein field. This was explained by the engineering mechanism as the principle of phase transition. This makes it possible to interpret engineering as an actual mechanism. As a result, in the anti-Einstein field, 1/0="infinity becomes nothing and 1 is produced from nothing". This phenomenon can be widely and generally interpreted in quantum mechanics. This shows the boundary between the Riemann field and the anti-Riemann field, and has an influence on the way after the fourth dimension.

It shows the possibility that the existence of energy breaks through the phase boundary by the equilibrium state proposed by Yoichiro Nambu, in which zero, matters and anti-matters collide with each other, and it also breaks through the phase boundary by the explosion caused by the pair collision, by the "conscious energy" which is generally called a concept, and by "material energy" proved by Einstein derived from the Riemann field.

If this above set is included in the h-form (homeostasis) of the Mitsuyoshi operator and undergoes a phase transition in a nested state, it can be expected to be applied to the new interpretation of the superstring theory that was later generated by Professor Nambu and to Boltzmann's thermodynamics. In this case, it is pointed out that the limit AB at both ends of the range (x+y) of the Mitsuyoshi operator is "uncertainty of differentiation at infinitesimal", but this operator includes the dynamic state in the h characteristic including the tense. In addition, since the concept number and the continuous quantity are calculated separately, a tool (operator) that releases physicists from uncertainty and infinitesimal problems and enables continuous quantity calculation and separation quantity calculation to be simultaneously performed is obtained.

As a side effect, there is a high possibility that the energy wave can be converted into mass, and, on the contrary, the mass can be converted into the energy wave, by using the Mitsuyoshi operator even in $E=mc^2$.

When the "E energy including all varieties such as consciousness and some observational influence (here, set to conscious energy)" is related to the fourth-dimensional phase transition model, it suggests the possibility that it may be treated as mathematical engineering like Fourier series transformation.

There is also a mathematical interest in "what happens to $\infty \geq 0$ and $0 \geq \infty$?" under the condition of purely $(0=)=1$. Therefore, considering the conditions for $\infty$, it is noticed that there are the following concentration conditions for $\infty$. The physical expansion corresponding to this is also considered as a control system.

I. Infinity has cardinality

II. Natural number cardinality ($\aleph 0$), real number cardinality ($\aleph 1$)

$$\aleph 1 = 2^{\aleph^0}, \aleph 0 \neq \aleph 1 \qquad \text{III.}$$

$$\aleph 1 + \aleph 1 + \aleph 1 + \ldots = \aleph 1 \qquad \text{IV.}$$

$$\aleph 0 \times \aleph 0 \times \aleph 0 \times \ldots = \aleph 1 \qquad \text{V.}$$

$$\aleph 0 + \aleph 0 + \aleph 0 + \ldots = \aleph 0 \qquad \text{VI.}$$

What is claimed is:

1. A quantum gate,
wherein the quantum gate is used for a quantum computer operation using an operator that has a simultaneous calculation characteristic of simultaneously performing a plurality of calculations,
wherein the quantum gate includes PPT indicating a proposition, CON indicating converse, INV indicating inverse, ANT indicating anti, MU indicating nothing, $MGN_+$ or $MGN_-$ indicating infinity, and KU indicating fluctuation.

2. The quantum gate according to claim 1,
wherein the simultaneous calculation characteristic targets attribute determination, continuous quantity calculation, separation quantity calculation, and wave-like function output.

3. The quantum gate according to claim 1,
wherein the operator indicates fluctuation of a wave nature and a particle nature of a quantum, and
the operator outputs a wave-like function in which an attribute and a time axis are converted when a spatial continuous change amount and a separation quantity are simultaneously input.

4. A quantum computer,
wherein the quantum computer is capable of performing a quantum computer operation by using the quantum gate according to claim 1.

*    *    *    *    *